United States Patent
Nishimiya

(10) Patent No.: US 12,441,653 B2
(45) Date of Patent: Oct. 14, 2025

(54) ALKALI-FREE GLASS PLATE

(71) Applicant: Nippon Electric Glass Co., Ltd., Shiga (JP)

(72) Inventor: Mayu Nishimiya, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 17/284,917

(22) PCT Filed: Oct. 7, 2019

(86) PCT No.: PCT/JP2019/039490
§ 371 (c)(1),
(2) Date: Apr. 13, 2021

(87) PCT Pub. No.: WO2020/080163
PCT Pub. Date: Apr. 23, 2020

(65) Prior Publication Data
US 2021/0380465 A1 Dec. 9, 2021

(30) Foreign Application Priority Data

| Oct. 15, 2018 | (JP) | 2018-194038 |
| Dec. 10, 2018 | (JP) | 2018-230725 |
| Feb. 25, 2019 | (JP) | 2019-031628 |
| Apr. 10, 2019 | (JP) | 2019-074958 |
| May 17, 2019 | (JP) | 2019-093662 |

(51) Int. Cl.
C03C 3/087 (2006.01)
C03C 3/091 (2006.01)
C03C 3/11 (2006.01)
H10K 71/00 (2023.01)

(52) U.S. Cl.
CPC ............. *C03C 3/087* (2013.01); *C03C 3/091* (2013.01); *C03C 3/11* (2013.01); *H10K 71/00* (2023.02)

(58) Field of Classification Search
CPC ................................ C03C 3/091; C03C 3/087
See application file for complete search history.

(56) References Cited

U.S. PATENT DOCUMENTS

| 2007/0191207 A1 | 8/2007 | Danielson et al. |
| 2009/0286091 A1 | 11/2009 | Danielson et al. |
| 2012/0088648 A1 | 4/2012 | Ellison et al. |
| 2012/0282450 A1* | 11/2012 | Kawaguchi ............ C03C 3/093 428/220 |
| 2013/0029830 A1 | 1/2013 | Koyama et al. |
| 2014/0049708 A1* | 2/2014 | Murata ................... C03C 3/097 349/200 |
| 2014/0377525 A1 | 12/2014 | Kawaguchi et al. |
| 2015/0087495 A1 | 3/2015 | Nishizawa et al. |
| 2015/0299028 A1 | 10/2015 | Nishizawa et al. |
| 2015/0315065 A1* | 11/2015 | Miwa ..................... C03C 3/095 501/67 |
| 2016/0039710 A1 | 2/2016 | Tokunaga et al. |
| 2016/0368815 A1* | 12/2016 | Hayashi ............. H01L 27/1218 |
| 2019/0161387 A1* | 5/2019 | Nomura ............ H01L 29/78654 |

FOREIGN PATENT DOCUMENTS

| JP | 2009-525942 | 7/2009 | |
| JP | 2012-106919 | 6/2012 | |
| JP | 2012-184146 | 9/2012 | |
| JP | 2013-151407 | 8/2013 | |
| JP | 2015-83533 | 4/2015 | |
| JP | 2015083533 A * | 4/2015 | ........... C03B 17/064 |
| JP | 2016005999 A * | 1/2016 | |
| JP | 2016-29001 | 3/2016 | |
| JP | 2016029001 A * | 3/2016 | ............. C03C 3/078 |
| JP | 2016183091 A * | 10/2016 | ........... C03B 17/064 |
| JP | 2016-188148 | 11/2016 | |
| JP | 2016-199467 | 12/2016 | |
| JP | 2017-7945 | 1/2017 | |
| TW | 201008890 | 3/2010 | |
| WO | WO-2011001920 A1 * | 1/2011 | ............... C03C 1/00 |
| WO | WO-2013161902 A1 * | 10/2013 | ............. C03C 3/087 |
| WO | 2013/183626 | 12/2013 | |
| WO | WO-2013183539 A1 * | 12/2013 | ............. C03C 3/087 |
| WO | WO-2013183626 A1 * | 12/2013 | ............. C03C 3/091 |
| WO | WO-2013183681 A1 * | 12/2013 | ............. C03C 15/00 |
| WO | 2014/087971 | 6/2014 | |
| WO | WO-2014087971 A1 * | 6/2014 | ............. C03C 3/078 |
| WO | WO-2017188126 A1 * | 11/2017 | ............. C03B 18/00 |
| WO | WO-2018038059 A1 * | 3/2018 | ............. C03C 17/06 |

OTHER PUBLICATIONS

Machine translation WO 2013183681, Dec. 2013 (Year: 2013).*
International Preliminary Report on Patentability issued Apr. 14, 2021 in International (PCT) Patent Application No. PCT/JP2019/039490.
International Search Report issued Nov. 26, 2019 in International (PCT) Application No. PCT/JP2019/039490.
Office Action issued Sep. 28, 2022 in Japanese Patent Application No. 2019-093662, with English-language translation.
Japanese Office Action dated Feb. 15, 2023 in corresponding Japan Patent Application No. 2019-093662, with English translation.
Office Action issued Aug. 18, 2025 in Taiwanese Patent Application No. 112114066, with English-language Translation.

* cited by examiner

*Primary Examiner* — Elizabeth A. Bolden
(74) *Attorney, Agent, or Firm* — WENDEROTH, LIND & PONACK, L.L.P.

(57) ABSTRACT

The present invention provides an alkali-free glass sheet, which has a content of $Li_2O+Na_2O+K_2O$ of from 0 mol % to 0.5 mol % in a glass composition, and has a Young's modulus of 78 GPa or more, a strain point of 680° C. or more, and a liquidus temperature of 1,450° C. or less.

14 Claims, No Drawings

ALKALI-FREE GLASS PLATE

TECHNICAL FIELD

The present invention relates to an alkali-free glass sheet, and more specifically, to an alkali-free glass sheet suitable for an OLED display.

BACKGROUND ART

An electronic device, such as an OLED display, is used in applications such as a flexible device and a display of a cellular phone because the electronic device is thin, is excellent in displaying a moving image, and has low power consumption.

A glass sheet is widely used as a substrate of an OLED display. The glass sheet of this application is mainly required to satisfy the following characteristics.
(1) To be substantially free of an alkali metal oxide, that is, to be alkali-free glass (to have a content of an alkali metal oxide of 0.5 mol % or less in a glass composition) in order to prevent a situation in which an alkali ion is diffused in a heat treatment step into a semiconductor substance having been formed into a film.
(2) To be excellent in productivity, particularly excellent in meltability and devitrification resistance in order to achieve a reduction in cost of the glass sheet.
(3) To have a high strain point in order to reduce the thermal shrinkage of the glass sheet in a low temperature polysilicon (LIPS) process.

CITATION LIST

Patent Literature 1: JP 2012-106919 A

SUMMARY OF INVENTION

Technical Problem

Incidentally, an OLED device has been widely deployed also in an OLED TV. The panel size of the OLED TV is much larger than that of a mobile product. It is expected that demands for an increase in size and a reduction in thickness of the glass sheet will increase in the future. As the size of the glass sheet is increased more and the thickness of the glass sheet is reduced more, the glass sheet is more liable to be deflected, and various defects are more liable to occur.

While the glass sheet formed by a glass manufacturer is subjected to steps such as cutting, annealing, inspection, and washing, the glass sheet is loaded into a cassette in which a plurality of shelves are formed during the steps and is conveyed. The cassette is generally configured so that opposing both sides of the glass sheet are placed on shelves formed on internal left and right surfaces thereof to allow the glass sheet to be held in a horizontal direction. However, a large and thin glass sheet has a large deflection amount, and hence part of the glass sheet is brought into contact with the cassette and the glass sheet is liable to be broken at the lime of loading of the glass sheet into the cassette, or the glass sheet largely swings and is liable to be unstable at the time of conveyance. The cassette having such configuration is also used in an electronic device manufacturer, resulting in occurrence of similar defects.

Further, as the size of the OLED device is increased more and the thickness of the OLED device is reduced more, the glass sheet is more liable to be deflected, resulting in a risk in that an image screen of the OLED TV may be seen in a distorted manner.

In order to solve the above-mentioned problems, a method involving increasing the Young's modulus of the glass sheet, to thereby reduce the deflection amount thereof is effective.

In addition, as described above, it is required that the strain point of the glass sheet be increased in order to reduce the thermal shrinkage of the glass sheet in the LTPS process.

However, when the Young's modulus and the strain point of the glass sheet are to be increased, the glass composition loses its balance, and the meltability and the devitrification resistance are reduced, with the result that the productivity of the glass sheet is liable to be reduced. As a result, the raw sheet cost of the glass sheet rises.

Thus, the present invention has been devised in view of the above-mentioned circumstances, and a technical object of the present invention is to provide an alkali-free glass sheet which is excellent in productivity and has a sufficiently high strain point and a sufficiently high Young's modulus.

Solution to Problem

The inventor of the present invention has repeated various experiments, and as a result, has found that the above-mentioned technical object can be achieved by strictly restricting the glass characteristics of an alkali-free glass sheet. Thus, the finding is proposed as the present invention. That is, according to one embodiment of the present invention, there is provided an alkali-free glass sheet, which has a content of $Li_2O+Na_2O+K_2O$ of from 0 mol % to 0.5 mol % in a glass composition, and has a Young's modulus of 78 GPa or more, a strain point of 680° C. or more, and a liquidus temperature of 1,450° C. or less. Herein, the "$Li_2O+Na_2O+K_2O$" refers to the total content of $Li_2O$, $Na_2O$, and $K_2O$. The "Young's modulus" refers to a value measured by a flexural resonance method. 1 GPa corresponds to about 101.9 Kgf/mm². The "strain point" refers to a value measured based on a method of ASTM C336. The "liquidus temperature" refers to a temperature at which a crystal precipitates after glass powder having passed through a standard 30-mesh sieve (500 μm) and remained on a 50-mesh sieve (300 μm) is placed in a platinum boat and kept for 24 hours in a gradient heating furnace.

In addition, it is preferred that the alkali-free glass sheet according to the one embodiment of the present invention comprise as the glass composition, in terms of mol %, 58% to 68% of $SiO_2$, 11% to 18% of $Al_2O_3$, 1.5% to 6% of $B_2O_3$, 0% to 0.5% of $Li_2O+Na_2O+K_2O$, 4% to 10% of MgO, 2% to 10% of CaO, and 2% to 13% of SrO+BaO. Herein, the "SrO+BaO" refers to the total content of SrO and BaO.

In addition, it is preferred that the alkali-free glass sheet according to the one embodiment of the present invention comprise as the glass composition, in terms of mol %, 58% to 67% of $SiO_2$, 11% to 18% of $Al_2O_3$, 1.5% to 6% of $B_2O_3$, 0% to 0.5% of $Li_2O+Na_2O+K_2O$, 4% to 10% of MgO, 2% to 10% of CaO, 1.5% to 8% of SrO, and 1.5% to 8% of BaO, and be substantially free of $As_2O_3$ and $Sb_2O_3$. Herein, the "substantially free of $As_2O_3$ and $Sb_2O_3$" refers to the case in which the contents of $As_2O_3$ and $Sb_2O_3$ in the glass composition are each less than 0.05%.

In addition, it is preferred that the alkali-free glass sheet according to the one embodiment of the present invention further comprise 0.001 mol % to 1 mol % of $SnO_2$.

In addition, it is preferred that the alkali-free glass sheet according to the one embodiment of the present invention have a strain point of 690° C. or more.

In addition, it is preferred that the alkali-free glass sheet according to the one embodiment of the present invention have a Young's modulus of more than 80 GPa.

In addition, it is preferred that the alkali-free glass sheet according to the one embodiment of the present invention have an average thermal expansion coefficient within a temperature range of from 30° C. to 380° C. of from $30 \times 10^{-7}$/° C. to $50 \times 10^{-7}$/° C. Herein, the "average thermal expansion coefficient within a temperature range of from 30° C. to 380° C." may be measured with a dilatometer.

In addition, it is preferred that the alkali-free glass sheet according to the one embodiment of the present invention have a liquidus viscosity of $10^{4.5}$ dPa·s or more. Herein, the "liquidus viscosity" refers to a glass viscosity at the liquidus temperature, and may be measured by a platinum sphere pull up method.

In addition, it is preferred that the alkali-free glass sheet according to the one embodiment of the present invention be used for an OLED device.

DESCRIPTION OF EMBODIMENTS

An alkali-free glass sheet of the present invention preferably comprises as a glass composition, in terms of mol %, 58% to 72% of $SiO_2$, 11% to 18% of $Al_2O_3$, 1.5% to 6% of $B_2O_3$, 0% to 0.5% of $Li_2O+Na_2O+K_2O$, 0% to 10% of MgO, 0% to 10% of CaO, 0% to 8% of SrO, and 0% to 8% of BaO, more preferably comprises as a glass composition, in terms of mol %, 58% to 68% of $SiO_2$, 11% to 18% of $Al_2O_3$, 1.5% to 6% of $B_2O_3$, 0% to 0.5% of $Li_2O+Na_2O+K_2O$, 4% to 10% of MgO, 2% to 10% of CaO, and 2% to 13% of SrO+BaO. In particular, it is still more preferred that the alkali-free glass sheet of the present invention comprise as a glass composition, in terms of mol %, 58% to 67% of $SiO_2$, 11% to 18% of $Al_2O_3$, 1.5% to 6% of $B_2O_3$, 0% to 0.5% of $Li_2O+Na_2O+K_2O$, 4% to 10% of MgO, 2% to 10% of CaO, 1.5% to 8% of SrO, and 1.5% to 8% of BaO and be substantially free of $As_2O_3$ and $Sb_2O_3$. The reasons why the contents of the components are limited as describe above are described below. In the descriptions of the contents of the components, the expression "%" represents "mold", unless otherwise specified.

$SiO_2$ is a component which forms the skeleton of glass. When the content of $SiO_2$ is too small, a thermal expansion coefficient is increased, and a density is increased. Accordingly, the lower limit content of $SiO_2$ is preferably 58%, still more preferably 59%, still more preferably 60%, still more preferably 61%, still more preferably 62%, still more preferably 63%, most preferably 64%. Meanwhile, when the content of $SiO_2$ is too large, a Young's modulus is reduced. Further, a viscosity at high temperature is increased, resulting in an increase in amount of heat required for melting. This causes a rise in melting cost, and in addition, leads to occurrence of defects due to an unmelted residue of a $SiO_2$ raw material, which may cause a reduction in yield. In addition, a devitrified crystal, such as cristobalite, is liable to precipitate, and a liquidus viscosity is liable to be reduced. Accordingly, the upper limit content of $SiO_2$ is preferably 72%, still more preferably 71%, still more preferably 70%, still more preferably 69.5%, still more preferably 69%, still more preferably 68%, most preferably 67%.

$Al_2O_3$ is a component which forms the skeleton of the glass, and is also a component which increases the Young's modulus, and is further a component which increases a strain point. When the content of $Al_2O_3$ is too small, the Young's modulus is liable to be reduced, and the strain point is liable to be reduced. Accordingly, the lower limit content of $Al_2O_3$ is preferably 11%, more preferably 11.2%, more preferably 11.4%, still more preferably 11.6%, still more preferably 11.8%, most preferably 12% Meanwhile, when the content of $Al_2O_3$ is too large, a devitrified crystal, such as mullite, is liable to precipitate, and the liquidus viscosity is liable to be reduced. Accordingly, the upper limit content of $Al_2O_3$ is preferably 18%, more preferably 17%, more preferably 16%, still more preferably 15.5%, still more preferably 15%, most preferably 14%.

The mole percent ratio $SiO_2/Al_2O_3$ is preferably from 4.2 to 5.8, more preferably from 4.5 to 5.5, particularly preferably from 4.8 to 5.3. When the ratio $SiO_2/Al_2O_3$ is too low, the strain point and/or devitrification resistance is liable to be reduced. Meanwhile, when the ratio $SiO_2/Al_2O_3$ is too high, the Young's modulus and/or meltability is liable to be reduced. The "$SiO_2/Al_2O_3$" refers to a value obtained by dividing the content of $SiO_2$ by the content of $Al_2O_3$.

$B_2O_3$ is a component which improves the meltability and the devitrification resistance. When the content of $B_2O_3$ is too small, the meltability and the devitrification resistance are liable to be reduced. Accordingly, the lower limit content of $B_2O_3$ is preferably 1.5%, more preferably 1.8%, more preferably 2.0%, still more preferably 2.2%, still more preferably 2.4%, most preferably 2.5%. Meanwhile, when the content of $B_2O_3$ is too large, the Young's modulus and the strain point are liable to be reduced. Accordingly, the upper limit content of $B_2O_3$ is preferably 6%, more preferably 5.7%, more preferably 5.3%, still more preferably 5.0%, still more preferably 4.8%, most preferably 4.5%.

The mole percent ratio $Al_2O_3/B_2O_3$ is preferably from 3 to 7.5, more preferably from 3.5 to 6, particularly preferably from 4 to 5. When the ratio $Al_2O_3/B_2O_3$ is too low, the Young's modulus is liable to be reduced. Meanwhile, when the ratio $Al_2O_3/B_2O_3$ is too high, the devitrification resistance is liable to be reduced. The "$Al_2O_3/B_2O_3$" refers to a value obtained by dividing the content of $Al_2O_3$ by the content of $B_2O_3$.

The total content of $Li_2O$, $Na_2O$, and $K_2O$ is from 0% to 0.5%, preferably from 0% to 0.2%, more preferably from 0% to 0.15%. When the total content of $Li_2O$, $Na_2O$, and $K_2O$ is too large, a situation in which an alkali ion is diffused in a heat treatment step into a semiconductor substance having been formed into a film may occur.

MgO is a component which remarkably increases the Young's modulus among alkaline earth metal oxides. When the content of MgO is too small, the meltability and the Young's modulus are liable to be reduced. Accordingly, the lower limit content of MgO is preferably 0%, more preferably 2%, more preferably 2.5%, still more preferably 3%, still more preferably 3.5%, still more preferably 4%, still more preferably 4.2%, most preferably 4.5%. Meanwhile, when the content of MgO is too large, a devitrified crystal, such as mullite, is liable to precipitate, and the liquidus viscosity is liable to be reduced. Accordingly, the upper limit content of MgO is preferably 10%, more preferably 9.5%, more preferably 9%, still more preferably 8.5%, still more preferably 8%, still more preferably 7.5%, still more preferably 7%, still more preferably 6.8%, most preferably 6.5%.

The mole percent ratio $(Al_2O_3+MgO)/B_2O_3$ is preferably from 3.5 to 10, more preferably from 4 to 8, particularly preferably from 4.5 to 6. When the ratio $(Al_2O_3+MgO)/B_2O_3$ is too low, the Young's modulus is liable to be reduced. Meanwhile, when the ratio $(Al_2O_3+MgO)/B_2O_3$ is too high, the devitrification resistance is liable to be reduced. The "$(Al_2O_3+MgO)/B_2O_3$" refers to a value obtained by dividing the total content of $Al_2O_3$ and MgO by the content of $B_2O_3$.

CaO is a component which reduces the viscosity at high temperature to remarkably improve the meltability without reducing the strain point. CaO is also a component which increases the Young's modulus. When the content of CaO is too small, the meltability is liable to be reduced. Accordingly, the lower limit content of CaO is preferably 0%, more preferably 2%, more preferably 2.5%, still more preferably 2.8%, still more preferably 3%, still more preferably 3.5%, still more preferably 3.8%, most preferably 4%. Meanwhile, when the content of CaO is too large, the thermal expansion coefficient may be improperly increased. Accordingly, the upper limit content of CaO is preferably 10%, more preferably 9.8%, more preferably 9.5%, still more preferably 9%, still more preferably 8.8%, still more preferably 8.5%, still more preferably 8%, still more preferably 7.8%, most preferably 7.5%.

SrO is a component which improves the devitrification resistance, and is further a component which reduces the viscosity at high temperature to improve the meltability without reducing the strain point. SrO is also a component which suppresses a reduction in liquidus viscosity. When the content of SrO is too small, it becomes difficult to exhibit the above-mentioned effects. Accordingly, the lower limit content of SrO is preferably 0%, more preferably 0.1%, more preferably 0.2%, still more preferably 0.3%, still more preferably 0.4%, still more preferably 0.5%, still more preferably 0.7%, still more preferably 0.8%, most preferably more than 1%. Meanwhile, when the content of SrO is too large, the thermal expansion coefficient and the density are liable to be increased. Accordingly, the upper limit content of SrO is preferably 8%, more preferably 7.5%, more preferably 7%, still more preferably 6.5%, most preferably 6%.

BaO is a component which improves the devitrification resistance. When the content of BaO is too small, it becomes difficult to exhibit the above-mentioned effect. Accordingly, the lower limit content of BaO is preferably 0%, more preferably 0.2%, more preferably 0.5%, still more preferably 1%, still more preferably 1.3%, most preferably 1.5%. Meanwhile, when the content of BaO is too large, the Young's modulus is liable to be reduced, and the thermal expansion coefficient and the density are liable to be increased. Accordingly, the upper limit content of BaO is preferably 10%, more preferably 8%, more preferably 7%, still more preferably 6%, still more preferably 5%, still more preferably 4%, most preferably 3.6%.

When the total content of MgO, CaO, SrO, and BaO is too small, the meltability is liable to be reduced. Accordingly, the lower limit of the total content of MgO, CaO, SrO, and BaO (RO) is preferably 13%, more preferably 14%, more preferably 15%, still more preferably 15.2%, most preferably 15.5%. Meanwhile, when the total content of MgO, CaO, SrO, and BaO is too large, the thermal expansion coefficient and the density are liable to be increased. Accordingly, the upper limit of the total content of MgO, CaO, SrO, and BaO (RO) is preferably 24%, more preferably 22%, more preferably 21%, still more preferably 20%, most preferably 19%.

When the total content of SrO and BaO is too small, the devitrification resistance and the meltability are liable to be reduced. Accordingly, the lower limit of the total content of SrO and BaO is preferably 0%, more preferably 1%, more preferably 1.5%, still more preferably 2%, most preferably 2.5%. Meanwhile, when the total content of SrO and BaO is too large, the Young's modulus is liable to be reduced, and the thermal expansion coefficient and the density are liable to be increased. Accordingly, the upper limit of the total content of SrO and BaO is preferably 13%, more preferably 10%, more preferably 8%, still more preferably 7%, still more preferably 6%, most preferably 5%.

The mole percent ratio (MgO+CaO)/(SrO+BaO) is preferably from 2.1 to 10, more preferably from 3 to 7, particularly preferably from 4 to 5. When the ratio (MgO+CaO)/(SrO+BaO) is too low, the Young's modulus is liable to be reduced. Meanwhile, when the ratio (MgO+CaO)/(SrO+BaO) is too high, the devitrification resistance is liable to be reduced. The "(MgO+CaO)/(SrO+BaO)" refers to a value obtained by dividing the total content of MgO and CaO by the total content of SrO and BaO.

For example, the following components may be added as optional components in addition to the above-mentioned components. The content of the components other than the above-mentioned components, in terms of total content, is preferably 10% or less, particularly preferably 5% or less from the viewpoint of appropriately exhibiting the effects of the present invention.

ZnO is a component which increases the meltability. However, when ZnO is contained in a large amount, the glass is liable to devitrify, and in addition, the strain point is liable to be reduced. The content of ZnO is preferably from 0% to 5%, from 0% to 3%, or from 0% to 2%, particularly preferably from 0% to less than 1%.

$P_2O_5$ is a component which increases the strain point, and is also a component which can remarkably suppress the precipitation of an alkaline earth aluminosilicate-based devitrified crystal, such as anorthite. However, when $P_2O_5$ is contained in a large amount, the glass is liable to undergo phase separation. The content of $P_2O_5$ is preferably from 0% to 2.5%, more preferably from 0.0005% to 1.5%, still more preferably from 0.001% to 0.5%, particularly preferably from 0.005% to 0.3%.

The mole percent ratio $Al_2O_3/(10,000 \times P_2O_5)$ is preferably from 0.12 to 10, more preferably from 0.2 to 5, particularly preferably from 0.3 to 2. When the ratio $Al_2O_3/(10,000 \times P_2O_5)$ is too low, the Young's modulus is liable to be reduced. Meanwhile, when the ratio $Al_2O_3/(10,000 \times P_2O_5)$ is too high, the alkaline earth aluminosilicate-based devitrified crystal, such as anorthite, is liable to precipitate. The "$Al_2O_3/(10,000 \times P_2O_5)$" refers to a value obtained by dividing the content of $Al_2O_3$ by the content of $P_2O_5$ multiplied by 10,000.

$TiO_2$ is a component which reduces the viscosity at high temperature to improve the meltability, and is also a component which suppresses solarization. However, when $TiO_2$ is contained in a large amount, the glass is colored, and thus a transmittance is liable to be reduced. The content of $TiO_2$ is preferably from 0% to 2.5%, more preferably from 0.0005% to 1%, still more preferably from 0.001% to 0.5%, particularly preferably from 0.005% to 0.1%.

The mole percent ratio $Al_2O_3/(1,000 \times TiO_2)$ is preferably from 0.1 to 10, more preferably from 0.6 to 4, particularly preferably from 1.1 to 1.6. When the ratio $Al_2O_3/(1,000 \times TiO_2)$ is too low, the Young's modulus is liable to be reduced. Meanwhile, when the ratio $Al_2O_3/(1,000 \times TiO_2)$ is too high, the meltability and solarization resistance are liable to be reduced. The "$Al_2O_3/(1,000 \times TiO_2)$" refers to a value obtained by dividing the content of $Al_2O_3$ by the content of $TiO_2$ multiplied by 1,000.

$Y_2O_3$, $Nb_2O_5$, and $La_2O_3$ each have an action of increasing the strain point, the Young's modulus, and the like. The total content and the individual contents of those components are each preferably from 0% to 5%, more preferably from 0% to 1%, still more preferably from 0% to 0.5%. When the total content and the individual contents of $Y_2O_3$, $Nb_2O_5$, and $La_2O_3$ are too large, the density and raw material cost are liable to be increased.

$SnO_2$ is a component which exhibits a satisfactory fining action in a high temperature region. In addition, $SnO_2$ is a component which increases the strain point, and is also a component which reduces the viscosity at high temperature. The content of $SnO_2$ is preferably from 0% to 1%, from 0.001% to 1%, or from 0.01% to 0.5%, particularly preferably from 0.05% to 0.3%. When the content of $SnO_2$ is too large, a devitrified crystal of $SnO_2$ is liable to precipitate. When the content of $SnO_2$ is less than 0.001%, it becomes difficult to exhibit the above-mentioned effects.

$SnO_2$ is suitable as a fining agent as describe above, but unless glass characteristics are impaired, F, $SO_3$, C, or metal powder, such as Al or Si, may each be added as a fining agent at up to 5% (preferably up to 1%, particularly preferably up to 0.5%). In addition, $CeO_2$ or the like may also be added as a fining agent at up to 5% (preferably up to 1%, particularly preferably up to 0.5%).

$As_2O_3$ and $Sb_2O_3$ are each effective as a fining agent. However, the alkali-free glass sheet of the present invention is substantially free of those components from an environmental viewpoint. Further, when $As_2O_3$ is contained, the solarization resistance tends to be reduced.

Cl is a component which promotes initial melting of a glass batch. In addition, when Cl is added, the action of the fining agent can be promoted. As a result thereof, while the melting cost is reduced, the lifetime of a glass production kiln can be prolonged. However, when the content of Cl is too large, the strain point is liable to be reduced. Accordingly, the content of Cl is preferably from 0% to 3%, more preferably from 0.0005% to 1%, particularly preferably from 0.001% to 0.5%. The following raw material may be used as a raw material for introducing Cl: an alkaline earth metal chloride, such as strontium chloride, aluminum chloride, or the like.

$Fe_2O_3$ is a component which is mixed in as a raw material impurity, and is also a component which reduces an electrical resistivity. The content of $Fe_2O_3$ is preferably from 0 ppm by mass to 300 ppm by mass or from 80 ppm by mass to 250 ppm by mass, particularly preferably from 100 ppm by mass to 200 ppm by mass. When the content of $Fe_2O_3$ is too small, the raw material cost is liable to rise. Meanwhile, when the content of $Fe_2O_3$ is too large, it becomes difficult to perform electric melting owing to an increase in electrical resistivity of the molten glass.

The alkali-free glass sheet of the present invention preferably has the following characteristics.

The average thermal expansion coefficient within a temperature range of from 30° C. to 380° C. is preferably from $30 \times 10^{-7}$/° C. to $50 \times 10^{-7}$/° C., from $32 \times 10^{-7}$/° C. to $48 \times 10^{-7}$/° C., from $33 \times 10^{-7}$/° C. to $45 \times 10^{-7}$/° C., or from $34 \times 10^{-7}$/° C. to $44 \times 10^{-7}$/° C., particularly preferably from $35 \times 10^{-7}$/° C. to $44 \times 10^{-7}$/° C. With this configuration, the thermal expansion coefficient easily matches the thermal expansion coefficient of Si to be used for a TFT.

The Young's modulus is 78 GPa or more, preferably more than 78 GPa or 80 GPa or more, particularly preferably 81 GPa or more. When the Young's modulus is too low, defects due to the deflection of the glass sheet are liable to occur.

The strain point is 680° C. or more, preferably more than 680° C. or 690° C. or more, particularly preferably 700° C. or more. With this configuration, the thermal shrinkage of the glass sheet can be suppressed in a LTPS process.

The liquidus temperature is 1,450° C. or less, preferably less than 1,210° C. or 1,200° C. or less, particularly preferably 1,190° C. or less. With this configuration, a situation in which a devitrified crystal is generated at the time of glass production, resulting in a reduction in productivity, is easily prevented. Further, the glass sheet is easily formed by an overflow down-draw method, and hence the surface quality of the glass sheet is easily improved. Besides, the manufacturing cost of the glass sheet can be reduced. The liquidus temperature serves as an indicator of the devitrification resistance. As the liquidus temperature becomes lower, the devitrification resistance is more excellent.

The liquidus viscosity is preferably $10^{4.8}$ dPa·s or more, $10^{5.0}$ dPa·s or more, or $10^{5.2}$ dPa·s or more, particularly preferably $10^{5.3}$ dPa·s or more. With this configuration, devitrification is less liable to occur at the time of forming, and hence the glass sheet is easily formed by an overflow down-draw method. As a result, the surface quality of the glass sheet can be improved. Besides, the manufacturing cost of the glass sheet can be reduced. The liquidus viscosity serves as indicators of the devitrification resistance and the formability. As the liquidus viscosity becomes higher, the devitrification resistance and the formability are improved more.

The temperature at a viscosity at high temperature of $10^{2.5}$ dPa·s is preferably 1,650° C. or less, 1,600° C. or less, or 1,580° C. or less, particularly preferably 1,560° C. or less. When the temperature at a viscosity at high temperature of $10^{2.5}$ dPa·s is too high, it becomes difficult to melt a glass batch, resulting in a rise in manufacturing cost of the glass sheet. The temperature at a viscosity at high temperature of $10^{2.5}$ dPa·s corresponds to a melting temperature. As the temperature becomes lower, the meltability is improved more.

The β-OH is an indicator of the amount of water in the glass. When the β-OH is reduced, the strain point can be increased. In addition, even with the same glass composition, a glass sheet having lower β-OH has a lower thermal shrinkage rate at a temperature equal to or lower than the strain point. The β-OH is preferably 0.30/mm or less, 0.25/mm or less, 0.20/mm or less, or 0.15/mm or less, particularly preferably 0.10/mm or less. When the β-OH is too low, the meltability is liable to be reduced. Accordingly, the β-OH is preferably 0.01/mm or more, particularly preferably 0.03/mm or more.

As a method of reducing the β-OH, the following methods are given: (1) a method involving selecting raw materials having low water contents; (2) a method involving adding a component (such as Cl or $SO_3$) which reduces the β-OH to the glass; (3) a method involving reducing the amount of water in a furnace atmosphere; (4) a method involving performing $N_2$ bubbling in molten glass; (5) a method involving adopting a small melting furnace; (6) a method involving increasing the flow rate of molten glass; and (7) a method involving adopting an electric melting method.

Herein, the "β-OH" refers to a value determined using the following mathematical formula by measuring the transmittances of the glass with an FT-IR.

$$\beta\text{-OH}=(1/X)\text{Log}(T_1/T_2)$$

X: Thickness (mm)

$T_1$: Transmittance (%) at a reference wavelength of 3,846 $cm^{-1}$ $T_2$: Minimum transmittance (%) at a wavelength around a hydroxyl group absorption wavelength of 3,600 $cm^{-1}$ It is preferred that the alkali-free glass sheet of the present invention be formed by an overflow down-draw method.

The overflow down-draw method refers to a method in which molten glass is caused to overflow from both sides of a heat-resistant trough-shaped structure, and the overflowing molten glasses are subjected to down-draw downward at the lower end of the trough-shaped structure while being joined, to thereby produce the glass sheet. By the overflow down-draw method, surfaces which are to serve as the surfaces of the glass sheet are formed in a state of free surfaces without being brought into contact with the trough-shaped refractory. As a result, a glass sheet having good surface quality can be manufactured without polishing at low cost, and a reduction in thickness is easily achieved as well.

Other than the overflow down-draw method, the glass sheet may be formed by, for example, a down-draw method (such as a slot down method) or a float method.

The sheet thickness of the alkali-free glass sheet of the present invention is not particularly limited, but is preferably less than 0.7 mm, 0.6 mm or less, or 0.5 mm or less, particularly preferably 0.4 mm or less. As the thickness becomes smaller, the weight saving of an OLED device can be achieved more. The sheet thickness may be adjusted based on, for example, a flow rate and a sheet-drawing speed at the time of glass production.

The alkali-free glass sheet of the present invention is preferably used for an OLED device, particularly for an OLED TV. In OLED TV applications, a plurality of devices are formed on the glass sheet, and the glass sheet is then cut and divided into the respective devices to achieve cost-cutting (so-called multiple patterning). The alkali-free glass sheet of the present invention has a low liquidus temperature and a high liquidus viscosity, and hence a large glass sheet is easily formed, and thus such demand can be appropriately satisfied.

Examples

The present invention is hereinafter described by way of Examples. Examples below are merely examples, and the present invention is by no means limited to Examples below.

Examples (Sample Nos. 1 to 137) and Comparative Examples (Sample Nos. 138 to 141) of the present invention are shown in Tables 1 to 14.

TABLE 1

|  |  | No. 1 | No. 2 | No. 3 | No. 4 | No. 5 | No. 6 | No. 7 | No. 8 | No. 9 | No. 10 |
|---|---|---|---|---|---|---|---|---|---|---|---|
| Glass compo- sition (mol %) | $SiO_2$ | 64.9 | 61.9 | 64.9 | 62.4 | 63.4 | 62.9 | 60.4 | 60.9 | 59.5 | 61.7 |
| | $Al_2O_3$ | 12.0 | 12.0 | 12.0 | 12.5 | 12.5 | 12.0 | 12.5 | 12.0 | 12.5 | 12.5 |
| | $B_2O_3$ | 5.0 | 5.0 | 2.0 | 5.0 | 5.0 | 5.0 | 5.0 | 4.0 | 4.0 | 5.0 |
| | $Li_2O$ | 0.0 | 0.0 | 0.0 | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 | 0.0 | 0.0 | 0.0 |
| | MgO | 6.0 | 7.0 | 7.0 | 8.0 | 8.0 | 7.0 | 6.0 | 8.0 | 8.5 | 8.0 |
| | CaO | 6.0 | 7.0 | 7.0 | 5.0 | 4.0 | 5.0 | 6.0 | 8.0 | 7.6 | 3.0 |
| | SrO | 3.0 | 3.5 | 3.5 | 3.5 | 3.5 | 5.0 | 4.0 | 3.0 | 4.0 | 6.8 |
| | BaO | 3.0 | 3.5 | 3.5 | 3.5 | 3.5 | 3.0 | 6.0 | 4.0 | 3.8 | 3.0 |
| | $SnO_2$ | 0.1 | 0.1 | 0.1 | 0.1 | 0.1 | 0.1 | 0.1 | 0.1 | 0.1 | 0.1 |
| | $P_2O_5$ | 0.002 | 0.002 | 0.003 | 0.002 | 0.011 | 0.005 | 0.002 | 0.003 | 0.011 | 0.002 |
| | $TiO_2$ | 0.012 | 0.012 | 0.012 | 0.012 | 0.01 | 0.008 | 0.013 | 0.012 | 0.012 | 0.011 |
| | Cl | 0.001 | 0.001 | 0.001 | 0.001 | 0.001 | 0.001 | 0.001 | 0.001 | 0.001 | 0.001 |
| $SiO_2/Al_2O_3$ | | 5.41 | 5.16 | 5.41 | 4.99 | 5.07 | 5.24 | 4.83 | 5.08 | 4.76 | 4.94 |
| $Al_2O_3/B_2O_3$ | | 2.40 | 2.40 | 6.00 | 2.50 | 2.50 | 2.40 | 2.50 | 3.00 | 3.13 | 2.50 |
| $Li_2O + Na_2O + K_2O$ | | 0.0 | 0.0 | 0.0 | 0.0 | 0.0 | 0.0 | 0.0 | 0.0 | 0.0 | 0.0 |
| $(Al_2O_3 + MgO)/B_2O_3$ | | 3.60 | 3.80 | 9.50 | 4.10 | 4.10 | 3.80 | 3.70 | 5.00 | 5.30 | 4.10 |
| RO | | 18.0 | 21.0 | 21.0 | 20.0 | 19.0 | 20.0 | 22.0 | 23.0 | 23.9 | 20.8 |
| SrO + BaO | | 6.0 | 7.0 | 7.0 | 7.0 | 7.0 | 8.0 | 10.0 | 7.0 | 7.8 | 9.8 |
| (MgO + CaO)/(SrO + BaO) | | 2.00 | 2.00 | 2.00 | 1.86 | 1.71 | 1.50 | 1.20 | 2.29 | 2.06 | 1.12 |
| $Al_2O_3/(10,000 \times P_2O_5)$ | | 0.60 | 0.60 | 0.40 | 0.63 | 0.11 | 0.24 | 0.63 | 0.40 | 0.11 | 0.63 |
| $Al_2O_3/(1,000 \times TiO_2)$ | | 1.00 | 1.00 | 1.00 | 1.04 | 1.25 | 1.50 | 0.96 | 1.00 | 1.04 | 1.14 |
| CTE [$\times 10^{-7}/°$ C.] | | 41.9 | 45.6 | 45.2 | 43.6 | 42.1 | 44.7 | 49.5 | 48.3 | 49.4 | 45.5 |
| Density [g/cm$^3$] | | 2.62 | 2.69 | 2.70 | 2.67 | 2.66 | 2.68 | 2.78 | 2.72 | 2.74 | 2.72 |
| Young's modulus [GPa] | | 80 | 81 | 83 | 82 | 81 | 81 | 80 | 83 | 84 | 82 |
| Ps [° C.] | | 690 | 681 | 708 | 690 | 693 | 690 | 682 | 688 | 688 | 689 |
| Ta [° C.] | | 745 | 733 | 762 | 743 | 747 | 743 | 735 | 738 | 737 | 742 |
| Ts [° C.] | | 966 | 940 | 976 | 953 | 962 | 955 | 939 | 939 | 931 | 949 |
| $10^4$ dPa · s [° C.] | | 1,267 | 1,220 | 1,267 | 1,233 | 1,250 | 1,238 | 1,214 | 1,204 | 1,186 | 1,225 |
| $10^3$ dPa · s [° C.] | | 1,421 | 1,366 | 1,416 | 1,378 | 1,398 | 1,385 | 1,356 | 1,346 | 1,321 | 1,365 |
| $10^{2.5}$ dPa · s [° C.] | | 1,522 | 1,461 | 1,513 | 1,471 | 1,493 | 1,481 | 1,446 | 1,434 | 1,406 | 1,459 |
| TL [° C.] | | 1,130 | 1,154 | 1,217 | 1,202 | 1,220 | 1,205 | 1,154 | 1,165 | 1,161 | 1,212 |
| $Log_{10} \eta TL$ | | 5.3 | 4.6 | 5.3 | 4.6 | 4.6 | 4.6 | 5.6 | 4.8 | 4.6 | 4.5 |

TABLE 2

|  |  | No. 11 | No. 12 | No. 13 | No. 14 | No. 15 | No. 16 | No. 17 | No. 18 | No. 19 | No. 20 |
|---|---|---|---|---|---|---|---|---|---|---|---|
| Glass compo- sition (mol %) | $SiO_2$ | 60.4 | 58.3 | 58.0 | 60.4 | 62.9 | 62.4 | 62.4 | 64.4 | 62.4 | 62.4 |
| | $Al_2O_3$ | 12.5 | 14.0 | 15.2 | 14.5 | 12.5 | 12.5 | 12.5 | 12.5 | 12.5 | 12.5 |
| | $B_2O_3$ | 5.0 | 4.0 | 4.5 | 5.0 | 5.0 | 5.0 | 5.0 | 5.0 | 5.0 | 5.0 |
| | $Li_2O$ | 0.0 | 0.0 | 0.0 | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 | 0.0 | 0.0 | 0.0 |
| | MgO | 8.0 | 8.0 | 7.0 | 8.0 | 5.0 | 8.0 | 8.0 | 8.0 | 8.0 | 8.0 |
| | CaO | 5.0 | 8.0 | 7.0 | 3.0 | 9.0 | 5.0 | 3.0 | 3.0 | 5.0 | 3.0 |

TABLE 2-continued

|  | No. 11 | No. 12 | No. 13 | No. 14 | No. 15 | No. 16 | No. 17 | No. 18 | No. 19 | No. 20 |
|---|---|---|---|---|---|---|---|---|---|---|
| SrO | 5.0 | 2.5 | 4.0 | 3.5 | 1.5 | 3.5 | 4.5 | 1.8 | 1.8 | 2.3 |
| BaO | 4.0 | 5.1 | 4.2 | 5.5 | 4.0 | 3.5 | 4.5 | 5.3 | 5.3 | 6.8 |
| $SnO_2$ | 0.1 | 0.1 | 0.1 | 0.1 | 0.1 | 0.1 | 0.1 | 0.1 | 0.1 | 0.1 |
| $P_2O_5$ | 0.003 | 0.011 | 0.011 | 0.002 | 0.005 | 0.003 | 0.002 | 0.005 | 0.003 | 0.002 |
| $TiO_2$ | 0.012 | 0.011 | 0.01 | 0.008 | 0.013 | 0.012 | 0.011 | 0.012 | 0.012 | 0.011 |
| Cl | 0.001 | 0.001 | 0.001 | 0.001 | 0.001 | 0.001 | 0.001 | 0.001 | 0.001 | 0.001 |
| $SiO_2/Al_2O_3$ | 4.83 | 4.16 | 3.82 | 4.17 | 5.03 | 4.99 | 4.99 | 5.15 | 4.99 | 4.99 |
| $Al_2O_3/B_2O_3$ | 2.50 | 3.50 | 3.38 | 2.90 | 2.50 | 2.50 | 2.50 | 2.50 | 2.50 | 2.50 |
| $Li_2O + Na_2O + K_2O$ | 0.0 | 0.0 | 0.0 | 0.0 | 0.0 | 0.0 | 0.0 | 0.0 | 0.0 | 0.0 |
| $(Al_2O_3 + MgO)/B_2O_3$ | 4.10 | 5.50 | 4.90 | 4.50 | 3.50 | 4.10 | 4.10 | 4.10 | 4.10 | 4.10 |
| RO | 22.0 | 23.6 | 22.2 | 20.0 | 19.5 | 20.0 | 20.0 | 18.0 | 20.0 | 20.0 |
| SrO + BaO | 9.0 | 7.6 | 8.2 | 9.0 | 5.5 | 7.0 | 9.0 | 7.1 | 7.1 | 9.1 |
| (MgO + CaO)/(SrO + BaO) | 1.44 | 2.11 | 1.71 | 1.22 | 2.55 | 1.86 | 1.22 | 1.55 | 1.83 | 1.21 |
| $Al_2O_3/(10,000 \times P_2O_5)$ | 0.42 | 0.13 | 0.14 | 0.73 | 0.25 | 0.42 | 0.63 | 0.25 | 0.42 | 0.63 |
| $Al_2O_3/(1,000 \times TiO_2)$ | 1.04 | 1.27 | 1.52 | 1.81 | 0.96 | 1.04 | 1.14 | 1.04 | 1.04 | 1.14 |
| CTE [×$10^{-7}$/° C.] | 47.4 | 49.2 | 47.7 | 44.1 | 44.9 | 43.6 | 44.3 | 40.7 | 43.9 | 44.6 |
| Density [g/cm³] | 2.73 | 2.77 | 2.76 | 2.75 | 2.65 | 2.67 | 2.71 | 2.67 | 2.69 | 2.74 |
| Young's modulus [GPa] | 82 | 85 | 84 | 82 | 80 | 82 | 81 | 80 | 81 | 80 |
| Ps [° C.] | 684 | 693 | 700 | 696 | 692 | 690 | 689 | 694 | 688 | 686 |
| Ta [° C.] | 735 | 743 | 751 | 749 | 746 | 743 | 743 | 749 | 741 | 740 |
| Ts [° C.] | 937 | 934 | 942 | 956 | 958 | 953 | 955 | 971 | 953 | 955 |
| $10^4$ dPa · s [° C.] | 1,205 | 1,183 | 1,188 | 1,228 | 1,241 | 1,233 | 1,240 | 1,272 | 1,238 | 1,247 |
| $10^3$ dPa · s [° C.] | 1,344 | 1,314 | 1,315 | 1,365 | 1,391 | 1,378 | 1,386 | 1,427 | 1,386 | 1,396 |
| $10^{2.5}$ dPa · s [° C.] | 1,433 | 1,394 | 1,396 | 1,452 | 1,483 | 1,471 | 1,480 | 1,523 | 1,478 | 1,489 |
| TL [° C.] | 1,176 | 1,157 | 1,182 | 1,207 | 1,179 | 1,202 | 1,207 | 1,223 | 1,187 | 1,188 |
| $Log_{10}\eta TL$ | 4.8 | 4.9 | 4.6 | 5.0 | 4.9 | 4.6 | 4.9 | 5.0 | 5.1 | 5.5 |

TABLE 3

|  |  | No. 21 | No. 22 | No. 23 | No. 24 | No. 25 | No. 26 | No. 27 | No. 28 | No. 29 | No. 30 |
|---|---|---|---|---|---|---|---|---|---|---|---|
| Glass composition (mol %) | $SiO_2$ | 64.9 | 64.9 | 64.9 | 64.9 | 64.9 | 64.9 | 65.9 | 65.9 | 65.9 | 65.9 |
|  | $Al_2O_3$ | 14.0 | 14.0 | 14.0 | 14.0 | 14.0 | 14.0 | 13.0 | 13.0 | 13.0 | 13.0 |
|  | $B_2O_3$ | 4.0 | 4.0 | 4.0 | 4.0 | 4.0 | 4.0 | 4.0 | 4.0 | 4.0 | 4.0 |
|  | $Li_2O$ | 0.0 | 0.0 | 0.0 | 0.0 | 0.0 | 0.0 | 0.0 | 0.0 | 0.0 | 0.0 |
|  | $Na_2O$ | 0.0 | 0.0 | 0.0 | 0.0 | 0.0 | 0.0 | 0.0 | 0.0 | 0.0 | 0.0 |
|  | $K_2O$ | 0.0 | 0.0 | 0.0 | 0.0 | 0.0 | 0.0 | 0.0 | 0.0 | 0.0 | 0.0 |
|  | MgO | 6.0 | 5.0 | 5.0 | 4.0 | 4.0 | 4.0 | 7.0 | 6.0 | 6.0 | 5.0 |
|  | CaO | 7.0 | 8.0 | 7.0 | 9.0 | 8.0 | 7.0 | 7.0 | 8.0 | 7.0 | 9.0 |
|  | SrO | 2.0 | 2.0 | 2.5 | 2.0 | 2.5 | 3.0 | 1.5 | 1.5 | 2.0 | 1.5 |
|  | BaO | 2.0 | 2.0 | 2.5 | 2.0 | 2.5 | 3.0 | 1.5 | 1.5 | 2.0 | 1.5 |
|  | $SnO_2$ | 0.1 | 0.1 | 0.1 | 0.1 | 0.1 | 0.1 | 0.1 | 0.1 | 0.1 | 0.1 |
|  | $P_2O_5$ | 0.003 | 0.003 | 0.003 | 0.004 | 0.004 | 0.004 | 0.005 | 0.005 | 0.003 | 0.003 |
|  | $TiO_2$ | 0.012 | 0.012 | 0.011 | 0.011 | 0.012 | 0.011 | 0.012 | 0.012 | 0.012 | 0.012 |
|  | Cl | 0.001 | 0.001 | 0.001 | 0.001 | 0.001 | 0.001 | 0.001 | 0.001 | 0.001 | 0.001 |
| $SiO_2/Al_2O_3$ |  | 4.64 | 4.64 | 4.64 | 4.64 | 4.64 | 4.64 | 5.07 | 5.07 | 5.07 | 5.07 |
| $Al_2O_3/B_2O_3$ |  | 3.50 | 3.50 | 3.50 | 3.50 | 3.50 | 3.50 | 3.25 | 3.25 | 3.25 | 3.25 |
| $Li_2O + Na_2O + K_2O$ |  | 0.0 | 0.0 | 0.0 | 0.0 | 0.0 | 0.0 | 0.0 | 0.0 | 0.0 | 0.0 |
| $(Al_2O_3 + MgO)/B_2O_3$ |  | 5.00 | 4.75 | 4.75 | 4.50 | 4.50 | 4.50 | 5.00 | 4.75 | 4.75 | 4.50 |
| RO |  | 17.0 | 17.0 | 17.0 | 17.0 | 17.0 | 17.0 | 17.0 | 17.0 | 17.0 | 17.0 |
| SrO + BaO |  | 4.0 | 4.0 | 5.0 | 4.0 | 5.0 | 6.0 | 3.0 | 3.0 | 4.0 | 3.0 |
| (MgO + CaO)/(SrO + BaO) |  | 3.25 | 3.25 | 2.40 | 3.25 | 2.40 | 1.83 | 4.67 | 4.67 | 3.25 | 4.67 |
| $Al_2O_3/(10,000 \times P_2O_5)$ |  | 0.47 | 0.47 | 0.47 | 0.35 | 0.35 | 0.35 | 0.26 | 0.26 | 0.43 | 0.43 |
| $Al_2O_3/(1,000 \times TiO_2)$ |  | 1.17 | 1.17 | 1.27 | 1.27 | 1.17 | 1.27 | 1.08 | 1.08 | 1.08 | 1.08 |
| CTE [×$10^{-7}$/° C.] |  | 38.9 | 39.7 | 39.8 | 40.3 | 40.5 | 41.2 | 40.4 | 38.9 | 39.1 | 39.4 |
| Density [g/cm³] |  | 2.59 | 2.59 | 2.61 | 2.59 | 2.61 | 2.63 | 2.55 | 2.56 | 2.58 | 2.56 |
| Young's modulus [GPa] |  | 83 | 82 | 82 | 82 | 81 | 81 | 83 | 83 | 82 | 82 |
| Ps [° C.] |  | 717 | 716 | 715 | 716 | 715 | 715 | 712 | 713 | 712 | 712 |
| Ta [° C.] |  | 772 | 771 | 770 | 771 | 771 | 771 | 767 | 768 | 767 | 767 |
| Ts [° C.] |  | 993 | 992 | 992 | 992 | 993 | 944 | 989 | 991 | 989 | 989 |
| $10^4$ dPa · s [° C.] |  | 1,282 | 1,283 | 1,288 | 1,284 | 1,293 | 1,287 | 1,282 | 1,282 | 1,285 | 1,284 |
| $10^3$ dPa · s [° C.] |  | 1,430 | 1,433 | 1,439 | 1,434 | 1,444 | 1,437 | 1,433 | 1,432 | 1,438 | 1,437 |
| $10^{2.5}$ dPa · s [° C.] |  | 1,526 | 1,529 | 1,536 | 1,531 | 1,544 | 1,534 | 1,531 | 1,530 | 1,539 | 1,536 |
| TL [° C.] |  | 1,177 | 1,216 | 1,205 | 1,230 | 1,210 | 1,215 | 1,184 | 1,185 | 1,181 | 1,208 |
| $Log_{10}\eta TL$ |  | 5.0 | 4.6 | 4.8 | 4.5 | 4.7 | 4.5 | 4.9 | 4.9 | 5.0 | 4.7 |

TABLE 4

| | | No. 31 | No. 32 | No. 33 | No. 34 | No. 35 | No. 36 | No. 37 | No. 38 | No. 39 | No. 40 |
|---|---|---|---|---|---|---|---|---|---|---|---|
| Glass composition (mol %) | $SiO_2$ | 65.6 | 65.6 | 66.9 | 66.9 | 66.9 | 66.9 | 66.9 | 66.9 | 65.9 | 65.9 |
| | $Al_2O_3$ | 13.0 | 13.1 | 12.0 | 12.0 | 12.0 | 12.0 | 12.0 | 12.0 | 14.0 | 14.0 |
| | $B_2O_3$ | 4.0 | 4.0 | 4.0 | 4.0 | 4.0 | 4.0 | 4.0 | 4.0 | 3.0 | 3.0 |
| | $Li_2O$ | 0.0 | 0.0 | 0.0 | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 | 0.0 | 0.0 | 0.0 |
| | MgO | 5.1 | 5.1 | 8.0 | 7.0 | 7.0 | 6.0 | 6.0 | 6.0 | 6.0 | 5.0 |
| | CaO | 7.4 | 7.8 | 7.0 | 8.0 | 7.0 | 9.0 | 8.0 | 7.0 | 7.0 | 8.0 |
| | SrO | 2.4 | 2.2 | 1.0 | 1.0 | 1.5 | 1.0 | 1.5 | 2.0 | 2.0 | 2.0 |
| | BaO | 2.4 | 2.2 | 1.0 | 1.0 | 1.5 | 1.0 | 1.5 | 2.0 | 2.0 | 2.0 |
| | $SnO_2$ | 0.1 | 0.1 | 0.1 | 0.1 | 0.1 | 0.1 | 0.1 | 0.1 | 0.1 | 0.1 |
| | $P_2O_5$ | 0.004 | 0.003 | 0.005 | 0.005 | 0.004 | 0.005 | 0.004 | 0.003 | 0.003 | 0.003 |
| | $TiO_2$ | 0.012 | 0.012 | 0.012 | 0.012 | 0.011 | 0.012 | 0.012 | 0.012 | 0.011 | 0.011 |
| | Cl | 0.001 | 0.001 | 0.001 | 0.001 | 0.001 | 0.001 | 0.001 | 0.001 | 0.001 | 0.001 |
| $SiO_2/Al_2O_3$ | | 5.03 | 5.02 | 5.58 | 5.58 | 5.58 | 5.58 | 5.58 | 5.58 | 4.71 | 4.71 |
| $Al_2O_3/B_2O_3$ | | 3.26 | 3.28 | 3.00 | 3.00 | 3.00 | 3.00 | 3.00 | 3.00 | 4.67 | 4.67 |
| $Li_2O + Na_2O + K_2O$ | | 0.0 | 0.0 | 0.0 | 0.0 | 0.0 | 0.0 | 0.0 | 0.0 | 0.0 | 0.0 |
| $(Al_2O_3 + MgO)/B_2O_3$ | | 4.54 | 4.56 | 5.00 | 4.75 | 4.75 | 4.50 | 4.50 | 4.50 | 6.67 | 6.33 |
| RO | | 17.2 | 17.2 | 17.0 | 17.0 | 17.0 | 17.0 | 17.0 | 17.0 | 17.0 | 17.0 |
| SrO + BaO | | 4.8 | 4.3 | 2.0 | 2.0 | 3.0 | 2.0 | 3.0 | 4.0 | 4.0 | 4.0 |
| (MgO + CaO)/(SrO + BaO) | | 2.62 | 2.99 | 7.50 | 7.50 | 4.67 | 7.50 | 4.67 | 3.25 | 3.25 | 3.25 |
| $Al_2O_3/(10,000 \times P_2O_5)$ | | 0.33 | 0.44 | 0.24 | 0.24 | 0.30 | 0.24 | 0.30 | 0.40 | 0.47 | 0.47 |
| $Al_2O_3/(1,000 \times TiO_2)$ | | 1.09 | 1.09 | 1.00 | 1.00 | 1.09 | 1.00 | 1.00 | 1.00 | 1.27 | 1.27 |
| CTE [$\times 10^{-7}/°$ C.] | | 40.0 | 39.9 | 36.7 | 37.6 | 38.0 | 38.4 | 38.7 | 39.3 | 38.7 | 39.6 |
| Density [$g/cm^3$] | | 2.59 | 2.59 | 2.52 | 2.52 | 2.54 | 2.53 | 2.54 | 2.57 | 2.59 | 2.59 |
| Young's modulus [GPa] | | 81 | 81 | 83 | 82 | 82 | 82 | 81 | 81 | 83 | 83 |
| Ps [° C.] | | 709 | 708 | 708 | 708 | 708 | 707 | 706 | 706 | 726 | 727 |
| Ta [° C.] | | 765 | 764 | 763 | 763 | 763 | 762 | 762 | 762 | 781 | 782 |
| Ts [° C.] | | 989 | 989 | 986 | 987 | 989 | 986 | 987 | 988 | 1,003 | 1,003 |
| $10^4$ dPa·s [° C.] | | 1,292 | 1,289 | 1,291 | 1,291 | 1,287 | 1,286 | 1,291 | 1,292 | 1,297 | 1,297 |
| $10^3$ dPa·s [° C.] | | 1,447 | 1,443 | 1,445 | 1,452 | 1,442 | 1,442 | 1,446 | 1,450 | 1,447 | 1,448 |
| $10^{2.5}$ dPa·s [° C.] | | 1,548 | 1,543 | 1,546 | 1,556 | 1,542 | 1,544 | 1,550 | 1,552 | 1,544 | 1,545 |
| TL [° C.] | | 1,209 | 1,190 | 1,217 | 1,232 | 1,222 | 1,211 | 1,185 | 1,162 | 1,227 | 1,247 |
| $Log_{10}\eta TL$ | | 4.7 | 4.9 | 4.6 | 4.5 | 4.6 | 4.7 | 5.0 | 5.2 | 4.6 | 4.4 |

TABLE 5

| | | No. 41 | No. 42 | No. 43 | No. 44 | No. 45 | No. 46 | No. 47 | No. 48 | No. 49 | No. 50 |
|---|---|---|---|---|---|---|---|---|---|---|---|
| Glass composition (mol %) | $SiO_2$ | 65.9 | 65.9 | 65.9 | 65.9 | 66.9 | 66.9 | 66.9 | 66.9 | 66.9 | 66.9 |
| | $Al_2O_3$ | 14.0 | 14.0 | 14.0 | 14.0 | 13.0 | 13.0 | 13.0 | 13.0 | 13.0 | 13.0 |
| | $B_2O_3$ | 3.0 | 3.0 | 3.0 | 3.0 | 3.0 | 3.0 | 3.0 | 3.0 | 3.0 | 3.0 |
| | $Li_2O$ | 0.0 | 0.0 | 0.0 | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 | 0.0 | 0.0 | 0.0 |
| | MgO | 5.0 | 4.0 | 4.0 | 4.0 | 7.0 | 6.0 | 6.0 | 5.0 | 5.0 | 5.0 |
| | CaO | 7.0 | 9.0 | 8.0 | 7.0 | 7.0 | 8.0 | 7.0 | 9.0 | 8.0 | 7.0 |
| | SrO | 2.5 | 2.0 | 2.5 | 3.0 | 1.5 | 1.5 | 2.0 | 1.5 | 2.0 | 2.5 |
| | BaO | 2.5 | 2.0 | 2.5 | 3.0 | 1.5 | 1.5 | 2.0 | 1.5 | 2.0 | 2.5 |
| | $SnO_2$ | 0.1 | 0.1 | 0.1 | 0.1 | 0.1 | 0.1 | 0.1 | 0.1 | 0.1 | 0.1 |
| | $P_2O_5$ | 0.003 | 0.003 | 0.003 | 0.002 | 0.003 | 0.003 | 0.003 | 0.003 | 0.003 | 0.003 |
| | $TiO_2$ | 0.013 | 0.012 | 0.011 | 0.012 | 0.012 | 0.012 | 0.011 | 0.012 | 0.012 | 0.012 |
| | Cl | 0.001 | 0.001 | 0.001 | 0.001 | 0.001 | 0.001 | 0.001 | 0.001 | 0.001 | 0.001 |
| $SiO_2/Al_2O_3$ | | 4.71 | 4.71 | 4.71 | 4.71 | 5.15 | 5.15 | 5.15 | 5.15 | 5.15 | 5.15 |
| $Al_2O_3/B_2O_3$ | | 4.67 | 4.67 | 4.67 | 4.67 | 4.33 | 4.33 | 4.33 | 4.33 | 4.33 | 4.33 |
| $Li_2O + Na_2O + K_2O$ | | 0.0 | 0.0 | 0.0 | 0.0 | 0.0 | 0.0 | 0.0 | 0.0 | 0.0 | 0.0 |
| $(Al_2O_3 + MgO)/B_2O_3$ | | 6.33 | 6.00 | 6.00 | 6.00 | 6.67 | 6.33 | 6.33 | 6.00 | 6.00 | 6.00 |
| RO | | 17.0 | 17.0 | 17.0 | 17.0 | 17.0 | 17.0 | 17.0 | 17.0 | 17.0 | 17.0 |
| SrO + BaO | | 5.0 | 4.0 | 5.0 | 6.0 | 3.0 | 3.0 | 4.0 | 3.0 | 4.0 | 5.0 |
| (MgO + CaO)/(SrO + BaO) | | 2.40 | 3.25 | 2.40 | 1.83 | 4.67 | 4.67 | 3.25 | 4.67 | 3.25 | 2.40 |
| $Al_2O_3/(10,000 \times P_2O_5)$ | | 0.47 | 0.47 | 0.47 | 0.70 | 0.43 | 0.43 | 0.43 | 0.43 | 0.43 | 0.43 |
| $Al_2O_3/(1,000 \times TiO_2)$ | | 1.08 | 1.17 | 1.27 | 1.17 | 1.08 | 1.08 | 1.18 | 1.08 | 1.08 | 1.08 |
| CTE [$\times 10^{-7}/°$ C.] | | 40.0 | 40.2 | 40.6 | 41.1 | 38.0 | 38.4 | 39.0 | 39.3 | 39.6 | 39.4 |
| Density [$g/cm^3$] | | 2.61 | 2.59 | 2.62 | 2.64 | 2.56 | 2.56 | 2.58 | 2.56 | 2.58 | 2.60 |
| Young's modulus [GPa] | | 83 | 83 | 82 | 82 | 84 | 84 | 83 | 83 | 82 | 82 |
| Ps [° C.] | | 726 | 727 | 725 | 725 | 723 | 722 | 721 | 721 | 720 | 720 |
| Ta [° C.] | | 782 | 783 | 782 | 782 | 779 | 777 | 777 | 777 | 776 | 776 |
| Ts [° C.] | | 1,004 | 1,004 | 1,005 | 1,006 | 1,001 | 1,000 | 1,002 | 1,000 | 1,001 | 1,003 |

TABLE 5-continued

|  | No. 41 | No. 42 | No. 43 | No. 44 | No. 45 | No. 46 | No. 47 | No. 48 | No. 49 | No. 50 |
|---|---|---|---|---|---|---|---|---|---|---|
| $10^4$ dPa · s [° C.] | 1,302 | 1,300 | 1,303 | 1,307 | 1,300 | 1,301 | 1,305 | 1,303 | 1,306 | 1,309 |
| $10^3$ dPa · s [° C.] | 1,453 | 1,450 | 1,456 | 1,459 | 1,453 | 1,455 | 1,460 | 1,457 | 1,462 | 1,466 |
| $10^{2.5}$ dPa · s [° C.] | 1,550 | 1,548 | 1,554 | 1,558 | 1,552 | 1,554 | 1,563 | 1,557 | 1,562 | 1,567 |
| TL [° C.] | 1,216 | 1,251 | 1,253 | 1,249 | 1,199 | 1,208 | 1,210 | 1,239 | 1,216 | 1,211 |
| $Log_{10}\eta TL$ | 4.8 | 4.4 | 4.4 | 4.5 | 4.9 | 4.8 | 4.9 | 4.6 | 4.8 | 4.9 |

TABLE 6

|  |  | No. 51 | No. 52 | No. 53 | No. 54 | No. 5 5 | No. 56 | No. 57 | No. 58 | No. 59 | No. 60 |
|---|---|---|---|---|---|---|---|---|---|---|---|
| Glass composition (mol %) | $SiO_2$ | 67.9 | 67.9 | 67.9 | 67.9 | 67.9 | 65.9 | 65.9 | 64.9 | 64.9 | 65.9 |
|  | $Al_2O_3$ | 12.0 | 12.0 | 12.0 | 12.0 | 12.0 | 13.0 | 13.0 | 14.0 | 14.0 | 13.0 |
|  | $B_2O_3$ | 3.0 | 3.0 | 3.0 | 3.0 | 3.0 | 4.0 | 4.0 | 4.0 | 4.0 | 4.0 |
|  | $Li_2O$ | 0.0 | 0.0 | 0.0 | 0.0 | 0.0 | 0.0 | 0.0 | 0.0 | 0.0 | 0.0 |
|  | $Na_2O$ | 0.0 | 0.0 | 0.0 | 0.0 | 0.0 | 0.0 | 0.0 | 0.0 | 0.0 | 0.0 |
|  | $K_2O$ | 0.0 | 0.0 | 0.0 | 0.0 | 0.0 | 0.0 | 0.0 | 0.0 | 0.0 | 0.0 |
|  | MgO | 8.0 | 7.0 | 7.0 | 6.0 | 6.0 | 5.0 | 5.0 | 7.0 | 6.0 | 7.0 |
|  | CaO | 7.0 | 8.0 | 7.0 | 8.0 | 7.0 | 8.0 | 7.0 | 6.0 | 6.0 | 6.0 |
|  | SrO | 1.0 | 1.0 | 1.5 | 1.5 | 2.0 | 2.0 | 2.5 | 2.0 | 2.5 | 2.0 |
|  | BaO | 1.0 | 1.0 | 1.5 | 1.5 | 2.0 | 2.0 | 2.5 | 2.0 | 2.5 | 2.0 |
|  | $SnO_2$ | 0.1 | 0.1 | 0.1 | 0.1 | 0.1 | 0.1 | 0.1 | 0.1 | 0.1 | 0.1 |
|  | $P_2O_5$ | 0.004 | 0.004 | 0.005 | 0.004 | 0.004 | 0.003 | 0.003 | 0.003 | 0.003 | 0.003 |
|  | $TiO_2$ | 0.013 | 0.012 | 0.012 | 0.012 | 0.012 | 0.011 | 0.012 | 0.012 | 0.012 | 0.012 |
|  | Cl | 0.001 | 0.001 | 0.001 | 0.001 | 0.001 | 0.001 | 0.001 | 0.001 | 0.001 | 0.001 |
| $SiO_2/Al_2O_3$ |  | 5.66 | 5.66 | 5.66 | 5.66 | 5.66 | 5.07 | 5.07 | 4.64 | 4.64 | 5.07 |
| $Al_2O_3/B_2O_3$ |  | 4.00 | 4.00 | 4.00 | 4.00 | 4.00 | 3.25 | 3.25 | 3.50 | 3.50 | 3.25 |
| $Li_2O + Na_2O + K_2O$ |  | 0.0 | 0.0 | 0.0 | 0.0 | 0.0 | 0.0 | 0.0 | 0.0 | 0.0 | 0.0 |
| $(Al_2O_3 + MgO)/B_2O_3$ |  | 6.67 | 6.33 | 6.33 | 6.00 | 6.00 | 4.50 | 4.50 | 5.25 | 5.00 | 5.00 |
| RO |  | 17.0 | 17.0 | 17.0 | 17.0 | 17.0 | 17.0 | 17.0 | 17.0 | 17.0 | 17.0 |
| SrO + BaO |  | 2.0 | 2.0 | 3.0 | 3.0 | 4.0 | 4.0 | 5.0 | 4.0 | 5.0 | 4.0 |
| (MgO + CaO)/(SrO + BaO) |  | 7.50 | 7.50 | 4.67 | 4.67 | 3.25 | 3.25 | 2.40 | 3.25 | 2.40 | 3.25 |
| $Al_2O_3/(10,000 \times P_2O_5)$ |  | 0.30 | 0.30 | 0.24 | 0.30 | 0.30 | 0.43 | 0.43 | 0.47 | 0.47 | 0.43 |
| $Al_2O_3/(1,000 \times TiO_2)$ |  | 0.92 | 1.00 | 1.00 | 1.00 | 1.00 | 1.18 | 1.08 | 1.17 | 1.17 | 1.08 |
| CTE [$\times 10^{-7}/°$ C.] |  | 36.0 | 37.5 | 37.9 | 38.6 | 39.1 | 39.7 | 40.0 | 38.3 | 39.3 | 38.5 |
| Density [g/cm$^3$] |  | 2.52 | 2.53 | 2.55 | 2.55 | 2.57 | 2.58 | 2.60 | 2.58 | 2.60 | 2.57 |
| Young's modulus [GPa] |  | 84 | 84 | 83 | 83 | 83 | 82 | 82 | 83 | 82 | 82 |
| Ps [° C.] |  | 718 | 717 | 716 | 717 | 715 | 712 | 710 | 718 | 716 | 712 |
| Ta [° C.] |  | 774 | 773 | 772 | 773 | 771 | 768 | 766 | 772 | 772 | 767 |
| Ts [° C.] |  | 998 | 998 | 999 | 1,001 | 999 | 990 | 991 | 991 | 993 | 990 |
| $10^4$ dPa · s [° C.] |  | 1,304 | 1,304 | 1,306 | 1,306 | 1,315 | 1,292 | 1,294 | 1,283 | 1,288 | 1,288 |
| $10^3$ dPa · s [° C.] |  | 1,461 | 1,461 | 1,464 | 1,465 | 1,483 | 1,446 | 1,448 | 1,432 | 1,438 | 1,440 |
| $10^{2.5}$ dPa · s [° C.] |  | 1,570 | 1,570 | 1,567 | 1,568 | 1,592 | 1,548 | 1,548 | 1,530 | 1,535 | 1,539 |
| TL [° C.] |  | 1,244 | 1,258 | 1,222 | 1,221 | 1,234 | 1,201 | 1,198 | 1,193 | 1,200 | 1,193 |
| $Log_{10}\eta TL$ |  | 4.5 | 4.4 | 4.7 | 4.7 | 4.7 | 4.8 | 4.9 | 4.8 | 4.8 | 4.9 |

TABLE 7

|  |  | No. 61 | No. 62 | No. 63 | No. 64 | No. 65 | No. 66 | No. 67 | No. 68 | No. 69 | No. 70 |
|---|---|---|---|---|---|---|---|---|---|---|---|
| Glass composition (mol %) | $SiO_2$ | 65.9 | 64.9 | 64.9 | 65.9 | 65.9 | 66.9 | 66.9 | 65.9 | 65.9 | 65.9 |
|  | $Al_2O_3$ | 13.0 | 14.0 | 14.0 | 13.0 | 13.0 | 12.0 | 12.0 | 14.0 | 14.0 | 14.0 |
|  | $B_2O_3$ | 4.0 | 4.0 | 4.0 | 4.0 | 4.0 | 4.0 | 4.0 | 3.0 | 3.0 | 3.0 |
|  | $Li_2O$ | 0.0 | 0.0 | 0.0 | 0.0 | 0.0 | 0.0 | 0.0 | 0.0 | 0.0 | 0.0 |
|  | $Na_2O$ | 0.0 | 0.0 | 0.0 | 0.0 | 0.0 | 0.0 | 0.0 | 0.0 | 0.0 | 0.0 |
|  | $K_2O$ | 0.0 | 0.0 | 0.0 | 0.0 | 0.0 | 0.0 | 0.0 | 0.0 | 0.0 | 0.0 |
|  | MgO | 6.0 | 6.0 | 6.0 | 6.0 | 6.0 | 7.0 | 6.0 | 7.0 | 6.0 | 5.0 |
|  | CaO | 6.0 | 7.0 | 7.0 | 7.0 | 7.0 | 6.0 | 6.0 | 6.0 | 6.0 | 6.0 |
|  | SrO | 2.5 | 4.0 | 0.0 | 4.0 | 0.0 | 2.0 | 2.5 | 2.0 | 2.5 | 3.0 |
|  | BaO | 2.5 | 0.0 | 4.0 | 0.0 | 4.0 | 2.0 | 2.5 | 2.0 | 2.5 | 3.0 |
|  | $SnO_2$ | 0.1 | 0.1 | 0.1 | 0.1 | 0.1 | 0.1 | 0.1 | 0.1 | 0.1 | 0.1 |
|  | $P_2O_5$ | 0.003 | 0.003 | 0.003 | 0.003 | 0.003 | 0.004 | 0.003 | 0.003 | 0.002 | 0.002 |
|  | $TiO_2$ | 0.012 | 0.012 | 0.012 | 0.012 | 0.012 | 0.012 | 0.012 | 0.011 | 0.011 | 0.011 |
|  | Cl | 0.001 | 0.001 | 0.001 | 0.001 | 0.001 | 0.001 | 0.001 | 0.001 | 0.001 | 0.001 |
| $SiO_2/Al_2O_3$ |  | 5.07 | 4.64 | 4.64 | 5.07 | 5.07 | 5.58 | 5.58 | 4.71 | 4.71 | 4.71 |
| $Al_2O_3/B_2O_3$ |  | 3.25 | 3.50 | 3.50 | 3.25 | 3.25 | 3.00 | 3.00 | 4.67 | 4.67 | 4.67 |
| $Li_2O + Na_2O + K_2O$ |  | 0.0 | 0.0 | 0.0 | 0.0 | 0.0 | 0.0 | 0.0 | 0.0 | 0.0 | 0.0 |

TABLE 7-continued

|  | No. 61 | No. 62 | No. 63 | No. 64 | No. 65 | No. 66 | No. 67 | No. 68 | No. 69 | No. 70 |
|---|---|---|---|---|---|---|---|---|---|---|
| $(Al_2O_3 + MgO)/B_2O_3$ | 4.75 | 5.00 | 5.00 | 4.75 | 4.75 | 4.75 | 4.50 | 7.00 | 6.67 | 6.33 |
| RO | 17.0 | 17.0 | 17.0 | 17.0 | 17.0 | 17.0 | 17.0 | 17.0 | 17.0 | 17.0 |
| SrO + BaO | 5.0 | 4.0 | 4.0 | 4.0 | 4.0 | 4.0 | 5.0 | 4.0 | 5.0 | 6.0 |
| (MgO + CaO)/(SrO + BaO) | 2.40 | 3.25 | 3.25 | 3.25 | 3.25 | 3.25 | 2.40 | 3.25 | 2.40 | 1.83 |
| $Al_2O_3/(10,000 \times P_2O_5)$ | 0.43 | 0.47 | 0.47 | 0.43 | 0.43 | 0.30 | 0.40 | 0.47 | 0.70 | 0.70 |
| $Al_2O_3/(1,000 \times TiO_2)$ | 1.08 | 1.17 | 1.17 | 1.08 | 1.08 | 1.00 | 1.00 | 1.27 | 1.27 | 1.27 |
| CTE [$\times 10^{-7}$/° C.] | 39.6 | 38.7 | 39.0 | 38.7 | 39.3 | 38.4 | 39.2 | 38.2 | 39.3 | 40.4 |
| Density [g/cm³] | 2.60 | 2.56 | 2.61 | 2.55 | 2.60 | 2.56 | 2.59 | 2.59 | 2.61 | 2.63 |
| Young's modulus [GPa] | 81 | 83 | 82 | 83 | 81 | 82 | 81 | 84 | 83 | 82 |
| Ps [° C.] | 710 | 718 | 715 | 713 | 710 | 707 | 707 | 727 | 726 | 725 |
| Ta [° C.] | 766 | 773 | 771 | 768 | 766 | 762 | 762 | 782 | 782 | 782 |
| Ts [° C.] | 991 | 990 | 992 | 988 | 990 | 988 | 989 | 1,002 | 1,010 | 1,006 |
| $10^4$ dPa·s [° C.] | 1,294 | 1,281 | 1,285 | 1,282 | 1,291 | 1,291 | 1,296 | 1,298 | 1,303 | 1,308 |
| $10^3$ dPa·s [° C.] | 1,450 | 1,430 | 1,434 | 1,432 | 1,443 | 1,450 | 1,455 | 1,449 | 1,454 | 1,461 |
| $10^{2.5}$ dPa·s [° C.] | 1,551 | 1,528 | 1,531 | 1,531 | 1,542 | 1,552 | 1,556 | 1,547 | 1,552 | 1,559 |
| TL [° C.] | 1,178 | 1,220 | 1,186 | 1,213 | 1,162 | 1,170 | 1,180 | 1,200 | 1,205 | 1,191 |
| $Log_{10} \eta TL$ | 5.1 | 4.6 | 4.9 | 4.6 | 5.2 | 5.1 | 5.0 | 4.9 | 4.9 | 5.1 |

TABLE 8

|  |  | No. 71 | No. 72 | No. 73 | No. 74 | No. 75 | No. 76 | No. 77 | No. 78 | No. 79 | No. 80 |
|---|---|---|---|---|---|---|---|---|---|---|---|
| Glass composition (mol %) | $SiO_2$ | 65.9 | 65.9 | 64.9 | 64.9 | 64.9 | 64.9 | 66.9 | 66.9 | 67.9 | 67.9 |
|  | $Al_2O_3$ | 13.0 | 14.0 | 14.0 | 14.0 | 14.0 | 13.0 | 13.0 | 13.0 | 12.0 | 12.0 |
|  | $B_2O_3$ | 3.0 | 4.0 | 5.0 | 5.0 | 5.0 | 5.0 | 4.0 | 4.0 | 3.0 | 3.0 |
|  | $Li_2O$ | 0.0 | 0.0 | 0.0 | 0.0 | 0.0 | 0.0 | 0.0 | 0.0 | 0.0 | 0.0 |
|  | $Na_2O$ | 0.0 | 0.0 | 0.0 | 0.0 | 0.0 | 0.0 | 0.0 | 0.0 | 0.0 | 0.0 |
|  | $K_2O$ | 0.0 | 0.0 | 0.0 | 0.0 | 0.0 | 0.0 | 0.0 | 0.0 | 0.0 | 0.0 |
|  | MgO | 7.0 | 6.0 | 6.0 | 6.0 | 6.0 | 6.0 | 6.0 | 6.0 | 6.0 | 6.0 |
|  | CaO | 6.0 | 6.0 | 6.0 | 6.0 | 6.0 | 7.0 | 7.0 | 6.0 | 7.0 | 7.0 |
|  | SrO | 2.5 | 2.0 | 2.0 | 4.0 | 0.0 | 2.0 | 1.0 | 2.0 | 4.0 | 0.0 |
|  | BaO | 2.5 | 2.0 | 2.0 | 0.0 | 4.0 | 2.0 | 2.0 | 2.0 | 0.0 | 4.0 |
|  | $SnO_2$ | 0.1 | 0.1 | 0.1 | 0.1 | 0.1 | 0.1 | 0.1 | 0.1 | 0.1 | 0.1 |
|  | $P_2O_5$ | 0.003 | 0.003 | 0.003 | 0.004 | 0.003 | 0.003 | 0.004 | 0.004 | 0.003 | 0.003 |
|  | $TiO_2$ | 0.011 | 0.011 | 0.011 | 0.011 | 0.001 | 0.002 | 0.001 | 0.002 | 0.001 | 0.002 |
|  | Cl | 0.001 | 0.001 | 0.001 | 0.001 | 0.001 | 0.001 | 0.001 | 0.001 | 0.001 | 0.001 |
| $SiO_2/Al_2O_3$ |  | 5.07 | 4.71 | 4.64 | 4.64 | 4.64 | 4.99 | 5.15 | 5.15 | 5.66 | 5.66 |
| $Al_2O_3/B_2O_3$ |  | 4.33 | 3.50 | 2.80 | 2.80 | 2.80 | 2.60 | 3.25 | 3.25 | 4.00 | 4.00 |
| $Li_2O + Na_2O + K_2O$ |  | 0.0 | 0.0 | 0.0 | 0.0 | 0.0 | 0.0 | 0.0 | 0.0 | 0.0 | 0.0 |
| $(Al_2O_3 + MgO)/B_2O_3$ |  | 6.67 | 5.00 | 4.00 | 4.00 | 4.00 | 3.80 | 4.75 | 4.75 | 6.00 | 6.00 |
| RO |  | 18.0 | 16.0 | 16.0 | 16.0 | 16.0 | 17.0 | 16.0 | 16.0 | 17.0 | 17.0 |
| SrO + BaO |  | 5.0 | 4.0 | 4.0 | 4.0 | 4.0 | 4.0 | 3.0 | 4.0 | 4.0 | 4.0 |
| (MgO + CaO)/(SrO + BaO) |  | 2.60 | 3.00 | 3.00 | 3.00 | 3.00 | 3.25 | 4.33 | 3.00 | 3.25 | 3.25 |
| $Al_2O_3/(10,000 \times P_2O_5)$ |  | 0.43 | 0.47 | 0.47 | 0.35 | 0.47 | 0.43 | 0.33 | 0.33 | 0.40 | 0.40 |
| $Al_2O_3/(1,000 \times TiO_2)$ |  | 1.18 | 1.27 | 1.27 | 1.27 | 14.00 | 6.50 | 13.00 | 6.50 | 12.00 | 6.00 |
| CTE [$\times 10^{-7}$/° C.] |  | 40.1 | 37.6 | 37.5 | 37.4 | 38.0 | 39.3 | 37.4 | 37.8 | 38.8 | 39.5 |
| Density [g/cm³] |  | 2.61 | 2.57 | 2.57 | 2.54 | 2.59 | 2.57 | 2.55 | 2.56 | 2.55 | 2.60 |
| Young's modulus [GPa] |  | 83 | 82 | 82 | 82 | 81 | 81 | 82 | 82 | 83 | 81 |
| Ps [° C.] |  | 717 | 721 | 711 | 713 | 713 | 704 | 715 | 715 | 716 | 714 |
| Ta [° C.] |  | 772 | 777 | 767 | 768 | 768 | 758 | 771 | 771 | 772 | 770 |
| Ts [° C.] |  | 993 | 999 | 989 | 988 | 991 | 978 | 997 | 998 | 997 | 999 |
| $10^4$ dPa·s [° C.] |  | 1,293 | 1,301 | 1,282 | 1,278 | 1,284 | 1,273 | 1,299 | 1,306 | 1,308 | 1,314 |
| $10^3$ dPa·s [° C.] |  | 1,446 | 1,457 | 1,431 | 1,426 | 1,433 | 1,424 | 1,452 | 1,462 | 1,468 | 1,475 |
| $10^{2.5}$ dPa·s [° C.] |  | 1,545 | 1,551 | 1,527 | 1,522 | 1,529 | 1,523 | 1,555 | 1,564 | 1,572 | 1,578 |
| TL [° C.] |  | 1,222 | 1,195 | 1,188 | 1,178 | 1,171 | 1,160 | 1,223 | 1,213 | 1,245 | 1,186 |
| $Log_{10} \eta TL$ |  | 4.6 | 5.0 | 4.9 | 5.0 | 5.1 | 5.1 | 4.7 | 4.8 | 4.5 | 5.1 |

TABLE 9

|  |  | No. 81 | No. 82 | No. 83 | No. 84 | No. 85 | No. 86 | No. 87 | No. 88 | No. 89 | No. 90 |
|---|---|---|---|---|---|---|---|---|---|---|---|
| Glass composition (mol %) | $SiO_2$ | 64.9 | 64.9 | 65.9 | 66.9 | 65.9 | 66.9 | 66.9 | 67.9 | 66.9 | 65.9 |
|  | $Al_2O_3$ | 14.0 | 14.0 | 14.0 | 14.0 | 14.0 | 14.0 | 14.0 | 14.0 | 13.0 | 14.0 |
|  | $B_2O_3$ | 4.0 | 4.0 | 4.0 | 4.0 | 4.0 | 4.0 | 3.0 | 3.0 | 4.0 | 4.0 |
|  | $Li_2O$ | 0.0 | 0.0 | 0.0 | 0.0 | 0.0 | 0.0 | 0.0 | 0.0 | 0.0 | 0.0 |
|  | $Na_2O$ | 0.0 | 0.0 | 0.0 | 0.0 | 0.0 | 0.0 | 0.0 | 0.0 | 0.0 | 0.0 |

TABLE 9-continued

|  | No. 81 | No. 82 | No. 83 | No. 84 | No. 85 | No. 86 | No. 87 | No. 88 | No. 89 | No. 90 |
|---|---|---|---|---|---|---|---|---|---|---|
| $K_2O$ | 0.0 | 0.0 | 0.0 | 0.0 | 0.0 | 0.0 | 0.0 | 0.0 | 0.0 | 0.0 |
| MgO | 7.0 | 7.0 | 6.0 | 6.0 | 6.0 | 6.0 | 6.0 | 6.0 | 6.0 | 6.0 |
| CaO | 6.0 | 6.0 | 7.0 | 7.0 | 6.0 | 6.0 | 7.0 | 7.0 | 5.0 | 5.0 |
| SrO | 4.0 | 0.0 | 1.0 | 0.0 | 1.5 | 0.5 | 1.0 | 0.0 | 2.5 | 2.5 |
| BaO | 0.0 | 4.0 | 2.0 | 2.0 | 2.5 | 2.5 | 2.0 | 2.0 | 2.5 | 2.5 |
| $SnO_2$ | 0.1 | 0.1 | 0.1 | 0.1 | 0.1 | 0.1 | 0.1 | 0.1 | 0.1 | 0.1 |
| $P_2O_5$ | 0.011 | 0.005 | 0.004 | 0.003 | 0.01 | 0.008 | 0.008 | 0.008 | 0.006 | 0.006 |
| $TiO_2$ | 0.001 | 0.002 | 0.002 | 0.002 | 0.002 | 0.002 | 0.001 | 0.002 | 0.002 | 0.002 |
| Cl | 0.001 | 0.001 | 0.001 | 0.001 | 0.001 | 0.001 | 0.001 | 0.001 | 0.001 | 0.001 |
| $SiO_2/Al_2O_3$ | 4.64 | 4.64 | 4.71 | 4.78 | 4.71 | 4.78 | 4.78 | 4.85 | 5.15 | 4.71 |
| $Al_2O_3/B_2O_3$ | 3.50 | 3.50 | 3.50 | 3.50 | 3.50 | 3.50 | 4.67 | 4.67 | 3.25 | 3.50 |
| $Li_2O + Na_2O + K_2O$ | 0.0 | 0.0 | 0.0 | 0.0 | 0.0 | 0.0 | 0.0 | 0.0 | 0.0 | 0.0 |
| $(Al_2O_3 + MgO)/B_2O_3$ | 5.25 | 5.25 | 5.00 | 5.00 | 5.00 | 5.00 | 6.67 | 6.67 | 4.75 | 5.00 |
| RO | 17.0 | 17.0 | 16.0 | 15.0 | 16.0 | 15.0 | 16.0 | 15.0 | 16.0 | 16.0 |
| SrO + BaO | 4.0 | 4.0 | 3.0 | 2.0 | 4.0 | 3.0 | 3.0 | 2.0 | 5.0 | 5.0 |
| (MgO + CaO)/(SrO + BaO) | 3.25 | 3.25 | 4.33 | 6.50 | 3.00 | 4.00 | 4.33 | 6.50 | 2.20 | 2.20 |
| $Al_2O_3/(10,000 \times P_2O_5)$ | 0.13 | 0.28 | 0.35 | 0.47 | 0.14 | 0.18 | 0.18 | 0.18 | 0.22 | 0.23 |
| $Al_2O_3/(1,000 \times TiO_2)$ | 14.00 | 7.00 | 7.00 | 7.00 | 7.00 | 7.00 | 14.00 | 7.00 | 6.50 | 7.00 |
| CTE [$\times 10^{-7}$/° C.] | 38.0 | 38.6 | 37.2 | 35.3 | 37.7 | 36.0 | 37.2 | 35.4 | 38.2 | 37.9 |
| Density [g/cm$^3$] | 2.61 | 2.61 | 2.56 | 2.53 | 2.58 | 2.55 | 2.56 | 2.54 | 2.56 | 2.58 |
| Young's modulus [GPa] | 84 | 83 | 83 | 83 | 83 | 83 | 84 | 84 | 81 | 82 |
| Ps [° C.] | 718 | 716 | 719 | 723 | 719 | 723 | 730 | 733 | 714 | 720 |
| Ta [° C.] | 772 | 771 | 776 | 780 | 775 | 779 | 786 | 790 | 771 | 776 |
| Ts [° C.] | 989 | 992 | 998 | 1,004 | 999 | 1,005 | 1,009 | 1,015 | 998 | 1,000 |
| $10^4$ dPa·s [° C.] | 1,276 | 1,286 | 1,291 | 1,305 | 1,295 | 1,304 | 1,310 | 1,322 | 1,306 | 1,299 |
| $10^3$ dPa·s [° C.] | 1,422 | 1,434 | 1,442 | 1,464 | 1,444 | 1,456 | 1,462 | 1,482 | 1,466 | 1,450 |
| $10^{2.5}$ dPa·s [° C.] | 1,519 | 1,531 | 1,538 | 1,571 | 1,542 | 1,553 | 1,561 | 1,592 | 1,572 | 1,549 |
| TL [° C.] | 1,178 | 1,207 | 1,192 | 1,270 | 1,189 | 1,266 | 1,221 | 1,285 | 1,211 | 1,195 |
| $Log_{10}\eta TL$ | 4.9 | 4.7 | 4.9 | 4.3 | 5.0 | 4.3 | 4.8 | 4.3 | 4.8 | 5.0 |

TABLE 10

|  |  | No. 91 | No. 92 | No. 93 | No. 94 | No. 95 | No. 96 | No. 97 | No. 98 | No. 99 | No. 100 |
|---|---|---|---|---|---|---|---|---|---|---|---|
| Glass composition (mol %) | $SiO_2$ | 66.9 | 66.4 | 66.9 | 66.9 | 67.4 | 67.6 | 66.7 | 65.8 | 68.7 | 67.5 |
|  | $Al_2O_3$ | 14.0 | 14.5 | 14.0 | 14.0 | 13.5 | 13.1 | 14.0 | 13.0 | 12.5 | 12.2 |
|  | $B_2O_3$ | 3.0 | 3.0 | 3.0 | 3.0 | 3.0 | 2.9 | 3.0 | 3.9 | 2.9 | 2.8 |
|  | $Li_2O$ | 0.0 | 0.0 | 0.0 | 0.0 | 0.0 | 0.0 | 0.0 | 0.0 | 0.0 | 0.0 |
|  | $Na_2O$ | 0.0 | 0.0 | 0.0 | 0.0 | 0.0 | 0.0 | 0.0 | 0.0 | 0.0 | 0.0 |
|  | $K_2O$ | 0.0 | 0.0 | 0.0 | 0.0 | 0.0 | 0.0 | 0.0 | 0.0 | 0.0 | 0.0 |
|  | MgO | 6.0 | 6.0 | 6.0 | 6.0 | 6.0 | 6.2 | 5.1 | 6.1 | 7.1 | 7.1 |
|  | CaO | 6.0 | 6.0 | 6.0 | 6.0 | 6.0 | 6.1 | 6.1 | 6.1 | 5.2 | 5.8 |
|  | SrO | 2.0 | 2.0 | 3.0 | 1.0 | 2.0 | 2.0 | 2.0 | 1.5 | 1.3 | 1.3 |
|  | BaO | 2.0 | 2.0 | 1.0 | 3.0 | 2.0 | 2.0 | 3.0 | 3.5 | 2.1 | 3.2 |
|  | $SnO_2$ | 0.1 | 0.1 | 0.1 | 0.1 | 0.1 | 0.1 | 0.1 | 0.1 | 0.1 | 0.1 |
|  | $P_2O_5$ | 0.007 | 0.011 | 0.002 | 0.003 | 0.011 | 0.011 | 0.002 | 0.005 | 0.003 | 0.002 |
|  | $TiO_2$ | 0.002 | 0.013 | 0.012 | 0.011 | 0.011 | 0.01 | 0.008 | 0.013 | 0.012 | 0.011 |
|  | Cl | 0.001 | 0.001 | 0.001 | 0.001 | 0.001 | 0.001 | 0.001 | 0.001 | 0.001 | 0.001 |
| $SiO_2/Al_2O_3$ | | 4.78 | 4.58 | 4.78 | 4.78 | 4.99 | 5.17 | 4.75 | 5.07 | 5.48 | 5.51 |
| $Al_2O_3/B_2O_3$ | | 4.67 | 4.83 | 4.67 | 4.67 | 4.50 | 4.48 | 4.73 | 3.29 | 4.37 | 4.36 |
| $Li_2O + Na_2O + K_2O$ | | 0.0 | 0.0 | 0.0 | 0.0 | 0.0 | 0.0 | 0.0 | 0.0 | 0.0 | 0.0 |
| $(Al_2O_3 + MgO)/B_2O_3$ | | 6.67 | 6.83 | 6.67 | 6.67 | 6.50 | 6.60 | 6.46 | 4.85 | 6.85 | 6.86 |
| RO | | 16.0 | 16.0 | 16.0 | 16.0 | 16.0 | 16.3 | 16.2 | 17.2 | 15.8 | 17.3 |
| SrO + BaO | | 4.0 | 4.0 | 4.0 | 4.0 | 4.0 | 4.1 | 5.0 | 5.0 | 3.5 | 4.5 |
| (MgO + CaO)/(SrO + BaO) | | 3.00 | 3.00 | 3.00 | 3.00 | 3.00 | 3.03 | 2.23 | 2.44 | 3.56 | 2.84 |
| $Al_2O_3/(10,000 \times P_2O_5)$ | | 0.20 | 0.13 | 0.70 | 0.47 | 0.12 | 0.12 | 0.70 | 0.26 | 0.42 | 0.61 |
| $Al_2O_3/(1,000 \times TiO_2)$ | | 7.00 | 1.12 | 1.17 | 1.27 | 1.23 | 1.31 | 1.75 | 1.00 | 1.05 | 1.11 |
| CTE [$\times 10^{-7}$/° C.] | | 37.2 | 37.0 | 37.1 | 37.4 | 37.4 | 37.4 | 38.4 | 39.7 | 39.2 | 39.7 |
| Density [g/cm$^3$] | | 2.58 | 2.58 | 2.56 | 2.59 | 2.57 | 2.57 | 2.61 | 2.61 | 2.58 | 2.61 |
| Young's modulus [GPa] | | 84 | 84 | 84 | 83 | 83 | 83 | 83 | 81 | 83 | 82 |
| Ps [° C.] | | 731 | 733 | 733 | 733 | 728 | 727 | 730 | 714 | 727 | 718 |
| Ta [° C.] | | 787 | 789 | 789 | 789 | 785 | 784 | 787 | 727 | 784 | 775 |
| Ts [° C.] | | 1,011 | 1,011 | 1,011 | 1,013 | 1,010 | 1,012 | 1,014 | 993 | 1,014 | 1,002 |
| $10^4$ dPa·s [° C.] | | 1,312 | 1,308 | 1,311 | 1,317 | 1,315 | 1,319 | 1,318 | 1,296 | 1,326 | 1,310 |
| $10^3$ dPa·s [° C.] | | 1,466 | 1,458 | 1,463 | 1,471 | 1,469 | 1,474 | 1,472 | 1,449 | 1,483 | 1,465 |
| $10^{2.5}$ dPa·s [° C.] | | 1,564 | 1,556 | 1,562 | 1,570 | 1,568 | 1,574 | 1,571 | 1,548 | 1,585 | 1,566 |
| TL [° C.] | | 1,202 | 1,239 | 1,214 | 1,208 | 1,197 | 1,188 | 1,204 | 1,155 | 1,220 | 1,158 |
| $Log_{10}\eta TL$ | | 5.0 | 4.6 | 4.9 | 5.0 | 5.1 | 5.2 | 5.0 | 5.4 | 4.9 | 5.4 |

TABLE 11

|  |  | No. 101 | No. 102 | No. 103 | No. 104 | No. 105 | No. 106 | No. 107 | No. 108 | No. 109 | No. 110 |
|---|---|---|---|---|---|---|---|---|---|---|---|
| Glass composition (mol %) | $SiO_2$ | 67.2 | 67.2 | 68.4 | 68.1 | 67.9 | 67.9 | 67.9 | 66.9 | 67.4 | 67.1 |
| | $Al_2O_3$ | 12.3 | 12.2 | 12.5 | 12.7 | 13.0 | 12.5 | 13.0 | 13.0 | 13.1 | 13.5 |
| | $B_2O_3$ | 3.4 | 2.6 | 2.9 | 5.1 | 2.8 | 2.8 | 2.8 | 3.8 | 3.7 | 2.8 |
| | $Li_2O$ | 0.0 | 0.0 | 0.0 | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 | 0.0 | 0.0 | 0.0 |
| | MgO | 7.2 | 8.1 | 8.1 | 5.4 | 5.1 | 6.1 | 5.6 | 6.1 | 6.1 | 5.6 |
| | CaO | 6.4 | 7.3 | 4.5 | 5.2 | 6.6 | 6.6 | 6.6 | 6.6 | 6.5 | 6.6 |
| | SrO | 1.3 | 1.3 | 2.3 | 0.0 | 1.5 | 2.0 | 0.5 | 1.5 | 1.5 | 1.5 |
| | BaO | 2.1 | 1.2 | 1.2 | 3.4 | 3.0 | 2.0 | 3.5 | 2.0 | 1.5 | 2.8 |
| | $SnO_2$ | 0.1 | 0.1 | 0.1 | 0.1 | 0.1 | 0.1 | 0.1 | 0.1 | 0.1 | 0.1 |
| | $P_2O_5$ | 0.005 | 0.003 | 0.002 | 0.011 | 0.002 | 0.005 | 0.003 | 0.004 | 0.003 | 0.003 |
| | $TiO_2$ | 0.012 | 0.012 | 0.011 | 0.01 | 0.008 | 0.013 | 0.012 | 0.009 | 0.01 | 0.009 |
| | Cl | 0.001 | 0.001 | 0.001 | 0.001 | 0.001 | 0.001 | 0.001 | 0.001 | 0.001 | 0.001 |
| $SiO_2/Al_2O_3$ | | 5.49 | 5.49 | 5.49 | 5.36 | 5.21 | 5.42 | 5.22 | 5.14 | 5.17 | 4.97 |
| $Al_2O_3/B_2O_3$ | | 3.57 | 4.66 | 4.25 | 2.51 | 4.59 | 4.50 | 4.59 | 3.38 | 3.50 | 4.76 |
| $Li_2O + Na_2O + K_2O$ | | 0.0 | 0.0 | 0.0 | 0.0 | 0.0 | 0.0 | 0.0 | 0.0 | 0.0 | 0.0 |
| $(Al_2O_3 + MgO)/B_2O_3$ | | 5.66 | 7.73 | 7.01 | 3.57 | 6.40 | 6.70 | 6.58 | 4.97 | 5.14 | 6.74 |
| RO | | 17.0 | 17.9 | 16.1 | 14.0 | 16.2 | 16.7 | 16.2 | 16.2 | 15.7 | 16.5 |
| SrO + BaO | | 3.4 | 2.5 | 3.5 | 3.4 | 4.5 | 4.0 | 4.0 | 3.5 | 3.0 | 4.3 |
| (MgO + CaO)/(SrO + BaO) | | 4.00 | 6.07 | 3.66 | 3.06 | 2.59 | 3.17 | 3.06 | 3.61 | 4.19 | 2.82 |
| $Al_2O_3/(10{,}000 \times P_2O_5)$ | | 0.25 | 0.41 | 0.62 | 0.12 | 0.65 | 0.25 | 0.43 | 0.33 | 0.44 | 0.45 |
| $Al_2O_3/(1{,}000 \times TiO_2)$ | | 1.02 | 1.02 | 1.13 | 1.27 | 1.63 | 0.96 | 1.08 | 1.45 | 1.31 | 1.50 |
| CTE [$\times 10^{-7}/°C$] | | 37.9 | 38.1 | 38.3 | 38.5 | 38.3 | 38.0 | 37.5 | 36.6 | 38.4 | 40.4 |
| Density [$g/cm^3$] | | 2.56 | 2.55 | 2.56 | 2.59 | 2.57 | 2.59 | 2.56 | 2.53 | 2.59 | 2.62 |
| Young's modulus [GPa] | | 82 | 84 | 84 | 79 | 82 | 82 | 82 | 82 | 82 | 83 |
| Ps [°C] | | 713 | 721 | 726 | 714 | 726 | 722 | 727 | 717 | 719 | 728 |
| Ta [°C] | | 768 | 775 | 782 | 772 | 783 | 778 | 784 | 774 | 776 | 784 |
| Ts [°C] | | 994 | 996 | 1,010 | 1,007 | 1,013 | 1,006 | 1,013 | 999 | 1,003 | 1,010 |
| $10^4$ dPa·s [°C] | | 1,298 | 1,293 | 1,318 | 1,325 | 1,323 | 1,314 | 1,322 | 1,303 | 1,306 | 1,315 |
| $10^3$ dPa·s [°C] | | 1,456 | 1,446 | 1,474 | 1,485 | 1,481 | 1,472 | 1,481 | 1,457 | 1,461 | 1,470 |
| $10^{2.5}$ dPa·s [°C] | | 1,558 | 1,545 | 1,574 | 1,586 | 1,582 | 1,572 | 1,584 | 1,556 | 1,560 | 1,571 |
| TL [°C] | | 1,183 | 1,208 | 1,247 | 1,197 | 1,202 | 1,188 | 1,181 | 1,173 | 1,180 | 1,200 |
| $\log_{10} \eta TL$ | | 5.1 | 4.8 | 4.6 | 5.1 | 5.1 | 5.2 | 5.3 | 5.2 | 5.2 | 5.1 |

TABLE 12

|  |  | No. 111 | No. 112 | No. 113 | No. 114 | No. 115 | No. 116 | No. 117 | No. 118 | No. 119 | No. 120 |
|---|---|---|---|---|---|---|---|---|---|---|---|
| Glass composition (mol %) | $SiO_2$ | 66.8 | 67.4 | 68.2 | 67.9 | 67.9 | 67.9 | 67.2 | 67.4 | 67.4 | 67.4 |
| | $Al_2O_3$ | 13.0 | 12.3 | 12.5 | 12.7 | 12.8 | 13.0 | 12.2 | 12.0 | 12.0 | 12.0 |
| | $B_2O_3$ | 3.0 | 2.8 | 3.0 | 3.0 | 3.0 | 3.0 | 2.8 | 2.0 | 2.0 | 2.0 |
| | $Li_2O$ | 0.0 | 0.0 | 0.0 | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 | 0.0 | 0.0 | 0.0 |
| | MgO | 5.1 | 7.0 | 6.0 | 6.0 | 5.8 | 5.7 | 7.1 | 6.5 | 6.5 | 6.5 |
| | CaO | 6.6 | 6.2 | 6.5 | 6.3 | 6.5 | 6.3 | 7.3 | 7.0 | 7.0 | 6.0 |
| | SrO | 2.5 | 1.2 | 1.7 | 1.7 | 1.4 | 1.4 | 1.3 | 3.0 | 2.0 | 4.0 |
| | BaO | 3.0 | 3.0 | 2.0 | 2.3 | 2.6 | 2.6 | 2.2 | 2.0 | 3.0 | 2.0 |
| | $SnO_2$ | 0.1 | 0.1 | 0.1 | 0.1 | 0.1 | 0.1 | 0.1 | 0.1 | 0.1 | 0.1 |
| | $P_2O_5$ | 0.004 | 0.004 | 0.003 | 0.003 | 0.003 | 0.003 | 0.004 | 0.003 | 0.003 | 0.003 |
| | $TiO_2$ | 0.009 | 0.011 | 0.01 | 0.01 | 0.01 | 0.01 | 0.01 | 0.01 | 0.01 | 0.009 |
| | Cl | 0.001 | 0.001 | 0.001 | 0.001 | 0.001 | 0.001 | 0.001 | 0.001 | 0.001 | 0.001 |
| $SiO_2/Al_2O_3$ | | 5.14 | 5.48 | 5.46 | 5.35 | 5.33 | 5.22 | 5.52 | 5.62 | 5.62 | 5.62 |
| $Al_2O_3/B_2O_3$ | | 4.39 | 4.39 | 4.17 | 4.23 | 4.25 | 4.33 | 4.40 | 6.00 | 6.00 | 6.00 |
| $Li_2O + Na_2O + K_2O$ | | 0.0 | 0.0 | 0.0 | 0.0 | 0.0 | 0.0 | 0.0 | 0.0 | 0.0 | 0.0 |
| $(Al_2O_3 + MgO)/B_2O_3$ | | 6.12 | 6.89 | 6.17 | 6.23 | 6.17 | 6.23 | 6.95 | 9.25 | 9.25 | 9.25 |
| RO | | 17.2 | 17.4 | 16.2 | 16.3 | 16.3 | 16.0 | 17.8 | 18.5 | 18.5 | 18.5 |
| SrO + BaO | | 5.5 | 4.2 | 3.7 | 4.0 | 4.0 | 4.0 | 3.5 | 5.0 | 5.0 | 6.0 |
| (MgO + CaO)/(SrO + BaO) | | 2.12 | 3.14 | 3.38 | 3.08 | 3.06 | 3.00 | 4.12 | 2.70 | 2.70 | 2.08 |
| $Al_2O_3/(10{,}000 \times P_2O_5)$ | | 0.32 | 0.31 | 0.42 | 0.42 | 0.43 | 0.43 | 0.30 | 0.40 | 0.40 | 0.40 |
| $Al_2O_3/(1{,}000 \times TiO_2)$ | | 1.44 | 1.12 | 1.25 | 1.27 | 1.28 | 1.30 | 1.22 | 1.20 | 1.20 | 1.33 |
| CTE [$\times 10^{-7}/°C$] | | 39.1 | 38.9 | 37.7 | 38.1 | 37.8 | 37.3 | 39.1 | 40.9 | 41.6 | 41.2 |
| Density [$g/cm^3$] | | 2.57 | 2.59 | 2.56 | 2.57 | 2.57 | 2.57 | 2.57 | 2.61 | 2.62 | 2.63 |
| Young's modulus [GPa] | | 82 | 83 | 82 | 82 | 82 | 82 | 83 | 84 | 83 | 83 |
| Ps [°C] | | 721 | 719 | 726 | 723 | 725 | 728 | 717 | 722 | 721 | 721 |
| Ta [°C] | | 778 | 775 | 783 | 780 | 783 | 786 | 773 | 777 | 776 | 777 |

TABLE 12-continued

|  | No. 111 | No. 112 | No. 113 | No. 114 | No. 115 | No. 116 | No. 117 | No. 118 | No. 119 | No. 120 |
|---|---|---|---|---|---|---|---|---|---|---|
| Ts [° C.] | 1,004 | 1,001 | 1,010 | 1,008 | 1,011 | 1,016 | 996 | 999 | 1,000 | 1,000 |
| $10^4$ dPa · s [° C.] | 1,310 | 1,309 | 1,318 | 1,316 | 1,320 | 1,326 | 1,300 | 1,302 | 1,305 | 1,304 |
| $10^3$ dPa · s [° C.] | 1,466 | 1,465 | 1,476 | 1,473 | 1,477 | 1,482 | 1,455 | 1,456 | 1,461 | 1,460 |
| $10^{2.5}$ dPa · s [° C.] | 1,566 | 1,566 | 1,576 | 1,575 | 1,578 | 1,583 | 1,556 | 1,557 | 1,562 | 1,560 |
| TL [° C.] | 1,227 | 1,183 | 1,201 | 1,196 | 1,191 | 1,207 | 1,192 | 1,218 | 1,204 | 1,236 |
| $Log_{10}\eta TL$ | 4.7 | 5.2 | 5.1 | 5.1 | 5.2 | 5.1 | 5.0 | 4.7 | 4.9 | 4.6 |

TABLE 13

|  |  | No. 121 | No. 122 | No. 123 | No. 124 | No. 125 | No. 126 | No. 127 | No. 128 | No. 129 | No. 130 |
|---|---|---|---|---|---|---|---|---|---|---|---|
| Glass composition (mol %) | $SiO_2$ | 67.4 | 68.4 | 68.4 | 68.4 | 68.4 | 67.2 | 67.5 | 67.2 | 67.2 | 67.2 |
| | $Al_2O_3$ | 12.0 | 12.0 | 12.0 | 12.0 | 12.0 | 13.0 | 13.0 | 13.3 | 13.0 | 13.0 |
| | $B_2O_3$ | 2.0 | 2.0 | 2.0 | 2.0 | 2.0 | 4.0 | 3.7 | 3.7 | 3.7 | 3.7 |
| | $Li_2O$ | 0.0 | 0.0 | 0.0 | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 | 0.0 | 0.0 | 0.0 |
| | MgO | 6.5 | 6.5 | 6.5 | 6.5 | 6.5 | 6.0 | 6.0 | 6.0 | 6.3 | 6.0 |
| | CaO | 8.0 | 8.0 | 7.0 | 7.0 | 6.0 | 6.5 | 6.5 | 6.5 | 6.5 | 6.5 |
| | SrO | 2.0 | 1.0 | 2.0 | 1.0 | 3.0 | 1.5 | 1.5 | 1.5 | 1.5 | 1.5 |
| | BaO | 2.0 | 2.0 | 2.0 | 3.0 | 2.0 | 1.7 | 1.7 | 1.7 | 1.7 | 2.0 |
| | $SnO_2$ | 0.1 | 0.1 | 0.1 | 0.1 | 0.1 | 0.1 | 0.1 | 0.1 | 0.1 | 0.1 |
| | $P_2O_5$ | 0.003 | 0.004 | 0.003 | 0.003 | 0.003 | 0.001 | 0.001 | 0.001 | 0.001 | 0.001 |
| | $TiO_2$ | 0.01 | 0.01 | 0.009 | 0.01 | 0.01 | 0.008 | 0.007 | 0.009 | 0.008 | 0.008 |
| | Cl | 0.001 | 0.001 | 0.001 | 0.001 | 0.001 | 0.001 | 0.001 | 0.001 | 0.001 | 0.001 |
| $SiO_2/Al_2O_3$ | | 5.62 | 5.70 | 5.70 | 5.70 | 5.70 | 5.17 | 5.19 | 5.05 | 5.17 | 5.17 |
| $Al_2O_3/B_2O_3$ | | 6.00 | 6.00 | 6.00 | 6.00 | 6.00 | 3.25 | 3.51 | 3.59 | 3.51 | 3.51 |
| $Li_2O + Na_2O + K_2O$ | | 0.0 | 0.0 | 0.0 | 0.0 | 0.0 | 0.0 | 0.0 | 0.0 | 0.0 | 0.0 |
| $(Al_2O_3 + MgO)/B_2O_3$ | | 9.25 | 9.25 | 9.25 | 9.25 | 9.25 | 4.75 | 5.14 | 5.22 | 5.22 | 5.14 |
| RO | | 18.5 | 17.5 | 17.5 | 17.5 | 17.5 | 15.7 | 15.7 | 15.7 | 16.0 | 16.0 |
| SrO + BaO | | 4.0 | 3.0 | 4.0 | 4.0 | 5.0 | 3.2 | 3.2 | 3.2 | 3.2 | 3.5 |
| (MgO + CaO)/(SrO + BaO) | | 3.63 | 4.83 | 3.38 | 3.38 | 2.50 | 3.91 | 3.91 | 3.91 | 4.00 | 3.57 |
| $Al_2O_3/(10,000 \times P_2O_5)$ | | 0.40 | 0.30 | 0.40 | 0.40 | 0.40 | 1.30 | 1.30 | 1.33 | 1.30 | 1.30 |
| $Al_2O_3/(1,000 \times TiO_2)$ | | 1.20 | 1.20 | 1.33 | 1.20 | 1.20 | 1.63 | 1.86 | 1.48 | 1.63 | 1.63 |
| CTE [$\times 10^{-7}/°$ C.] | | 40.4 | 39.0 | 39.1 | 39.4 | 39.8 | 37.1 | 37.1 | 37.2 | 37.4 | 37.8 |
| Density [g/cm³] | | 2.60 | 2.57 | 2.58 | 2.60 | 2.60 | 2.54 | 2.54 | 2.55 | 2.55 | 2.56 |
| Young's modulus [GPa] | | 84 | 84 | 84 | 83 | 83 | 82 | 83 | 82 | 83 | 82 |
| Ps [° C.] | | 722 | 725 | 725 | 725 | 726 | 720 | 723 | 724 | 722 | 721 |
| Ta [° C.] | | 778 | 782 | 782 | 782 | 783 | 776 | 780 | 781 | 778 | 777 |
| Ts [° C.] | | 999 | 1,008 | 1,009 | 1,009 | 1,010 | 1,002 | 1,006 | 1,006 | 1,003 | 1,003 |
| $10^4$ dPa · s [° C.] | | 1,300 | 1,315 | 1,323 | 1,322 | 1,319 | 1,309 | 1,314 | 1,309 | 1,307 | 1,308 |
| $10^3$ dPa · s [° C.] | | 1,455 | 1,473 | 1,480 | 1,480 | 1,477 | 1,462 | 1,468 | 1,463 | 1,460 | 1,462 |
| $10^{2.5}$ dPa · s [° C.] | | 1,554 | 1,574 | 1,584 | 1,582 | 1,579 | 1,560 | 1,566 | 1,561 | 1,558 | 1,561 |
| TL [° C.] | | 1,216 | 1,219 | 1,201 | 1,210 | 1,222 | 1,182 | 1,169 | 1,197 | 1,182 | 1,172 |
| $Log_{10}\eta TL$ | | 4.7 | 4.8 | 5.1 | 5.0 | 4.9 | 5.2 | 5.4 | 5.0 | 5.2 | 5.3 |

TABLE 14

|  |  | No. 131 | No. 132 | No. 133 | No. 134 | No. 135 | No. 136 |
|---|---|---|---|---|---|---|---|
| Glass composition (mol %) | $SiO_2$ | 67.6 | 68.1 | 67.9 | 68.3 | 67.4 | 67.6 |
| | $Al_2O_3$ | 12.3 | 12.3 | 12.3 | 12.3 | 13.0 | 13.1 |
| | $B_2O_3$ | 2.8 | 2.8 | 2.8 | 2.8 | 3.7 | 3.4 |
| | $Li_2O$ | 0.0 | 0.0 | 0.0 | 0.0 | 0.0 | 0.0 |
| | $Na_2O$ | 0.0 | 0.0 | 0.0 | 0.0 | 0.0 | 0.0 |
| | $K_2O$ | 0.0 | 0.0 | 0.0 | 0.0 | 0.0 | 0.0 |
| | MgO | 7.0 | 6.5 | 6.8 | 6.5 | 6.1 | 6.1 |
| | CaO | 6.2 | 6.2 | 6.2 | 6.2 | 6.5 | 6.5 |
| | SrO | 1.4 | 1.4 | 1.5 | 1.5 | 1.5 | 1.5 |
| | BaO | 2.6 | 2.6 | 2.4 | 2.3 | 1.5 | 1.7 |
| | $SnO_2$ | 0.1 | 0.1 | 0.1 | 0.1 | 0.1 | 0.1 |
| | $P_2O_5$ | 0.001 | 0.001 | 0.001 | 0.001 | 0.001 | 0.001 |
| | $TiO_2$ | 0.008 | 0.009 | 0.008 | 0.008 | 0.008 | 0.008 |
| | Cl | 0.001 | 0.001 | 0.001 | 0.001 | 0.001 | 0.001 |
| $SiO_2/Al_2O_3$ | | 5.50 | 5.54 | 5.52 | 5.55 | 5.17 | 5.16 |
| $Al_2O_3/B_2O_3$ | | 4.39 | 4.39 | 4.39 | 4.39 | 3.50 | 3.85 |
| $Li_2O + Na_2O + K_2O$ | | 0.0 | 0.0 | 0.0 | 0.0 | 0.0 | 1.0 |
| $(Al_2O_3 + MgO)/B_2O_3$ | | 6.89 | 6.71 | 6.82 | 6.71 | 5.15 | 5.65 |

TABLE 14-continued

|  |  |  |  |  |  |  |
|---|---|---|---|---|---|---|
| RO | 17.2 | 16.7 | 16.9 | 16.5 | 15.7 | 15.8 |
| SrO + BaO | 4.0 | 4.0 | 3.9 | 3.8 | 3.0 | 3.2 |
| (MgO + CaO)/(SrO + BaO) | 3.30 | 3.18 | 3.33 | 3.34 | 4.20 | 3.94 |
| $Al_2O_3/(10{,}000 \times P_2O_5)$ | 1.23 | 1.23 | 1.23 | 1.23 | 1.30 | 1.31 |
| $Al_2O_3/(1{,}000 \times TiO_2)$ | 1.54 | 1.37 | 1.54 | 1.54 | 1.63 | 1.64 |
| CTE [×10$^{-7}$/° C.] | 38.9 | 38.9 | 38.8 | 38.2 | 36.8 | 36.9 |
| Density [g/cm³] | 2.58 | 2.58 | 2.58 | 2.57 | 2.53 | 2.55 |
| Young's modulus [GPa] | 83 | 83 | 83 | 83 | 83 | 83 |
| Ps [° C.] | 720 | 721 | 722 | 723 | 720 | 724 |
| Ta [° C.] | 777 | 778 | 779 | 780 | 777 | 781 |
| Ts [° C.] | 1,002 | 1,006 | 1,005 | 1,009 | 1,004 | 1,007 |
| 10⁴ dPa·s [° C.] | 1,311 | 1,318 | 1,315 | 1,321 | 1,311 | 1,313 |
| 10³ dPa·s [° C.] | 1,465 | 1,474 | 1,470 | 1,476 | 1,466 | 1,466 |
| 10$^{2.5}$ dPa·s [° C.] | 1,564 | 1,573 | 1,570 | 1,576 | 1,564 | 1,563 |
| TL [° C.] | 1,170 | 1,179 | 1,178 | 1,186 | 1,174 | 1,192 |
| Log₁₀ηTL | 5.3 | 5.3 | 5.3 | 5.2 | 5.3 | 5.1 |

|  |  | No. 137 | No. 138 | No. 139 | No. 140 | No. 141 |
|---|---|---|---|---|---|---|
| Glass composition (mol %) | SiO₂ | 67.5 | 70.9 | 57.9 | 57.7 | 67.9 |
|  | Al₂O₃ | 13.2 | 12.0 | 13.0 | 14.0 | 19.0 |
|  | B₂O₃ | 3.3 | 5.0 | 9.0 | 5.0 | 2.0 |
|  | Li₂O | 0.0 | 0.0 | 0.0 | 0.0 | 0.0 |
|  | Na₂O | 0.0 | 0.0 | 0.0 | 0.0 | 0.0 |
|  | K₂O | 0.0 | 0.0 | 0.0 | 0.0 | 0.0 |
|  | MgO | 6.1 | 4.0 | 8.0 | 8.0 | 4.0 |
|  | CaO | 6.5 | 4.0 | 5.0 | 3.0 | 4.0 |
|  | SrO | 1.6 | 2.0 | 1.8 | 2.3 | 2.0 |
|  | BaO | 1.7 | 2.0 | 5.3 | 10.0 | 2.0 |
|  | SnO₂ | 0.1 | 0.1 | 0.1 | 0.1 | 0.1 |
|  | P₂O₅ | 0.001 | 0.011 | 0.005 | 0.002 | 0.008 |
|  | TiO₂ | 0.008 | 0.01 | 0.008 | 0.013 | 0.012 |
|  | Cl | 0.001 | 0.001 | 0.001 | 0.001 | 0.001 |
| SiO₂/Al₂O₃ |  | 5.11 | 5.91 | 4.45 | 4.12 | 3.57 |
| Al₂O₃/B₂O₃ |  | 4.00 | 2.40 | 1.44 | 2.80 | 9.50 |
| Li₂O + Na₂O + K₂O |  | 2.0 | 0.0 | 0.0 | 0.0 | 0.0 |
| (Al₂O₃ + MgO)/B₂O₃ |  | 5.85 | 3.20 | 2.30 | 4.40 | 11.00 |
| RO |  | 15.9 | 12.0 | 20.0 | 23.3 | 12.0 |
| SrO + BaO |  | 3.3 | 4.0 | 7.1 | 12.3 | 4.0 |
| (MgO + CaO)/(SrO + BaO) |  | 3.82 | 2.00 | 1.83 | 0.89 | 2.00 |
| $Al_2O_3/(10{,}000 \times P_2O_5)$ |  | 1.32 | 0.11 | 0.26 | 0.70 | 0.24 |
| $Al_2O_3/(1{,}000 \times TiO_2)$ |  | 1.65 | 1.20 | 1.63 | 1.08 | 1.58 |
| CTE [×10$^{-7}$/° C.] |  | 36.3 | 33.1 | 44.7 | 50.7 | 32.1 |
| Density [g/cm³] |  | 2.55 | 2.50 | 2.68 | 2.90 | 2.58 |
| Young's modulus [GPa] |  | 83 | 78 | 79 | 81 | 86 |
| Ps [° C.] |  | 725 | 715 | 654 | 679 | 759 |
| Ta [° C.] |  | 782 | 776 | 703 | 731 | 818 |
| Ts [° C.] |  | 1,007 | 1025 | 905 | 929 | 1,043 |
| 10⁴ dPa·s [° C.] |  | 1,314 | 1,361 | 1,169 | 1,197 | 1,350 |
| 10³ dPa·s [° C.] |  | 1,469 | 1,538 | 1,304 | 1,332 | 1,488 |
| 10$^{2.5}$ dPa·s [° C.] |  | 1,567 | 1,653 | 1,387 | 1,413 | 1,582 |
| TL [° C.] |  | 1,184 | 1,207 | 1,100 | 1,131 | >1,450 |
| Log₁₀ηTL |  | 5.2 | 5.3 | 5.3 | 6.4 | Unmeasurable |

First, a glass batch prepared by blending glass raw materials so as to achieve the glass composition shown in each Table was loaded in a platinum crucible, and then melted at from 1,600° C. to 1,650° C. for 24 hours. In melting the glass batch, molten glass was stirred to be homogenized by using a platinum stirrer. Next, the molten glass was poured on a carbon sheet and formed into a sheet shape, followed by being annealed at a temperature around an annealing point for 30 minutes. Each of the resultant samples was evaluated for its average thermal expansion coefficient CTE within a temperature range of from 30° C. to 380° C., density, Young's modulus, strain point Ps, annealing point Ta, softening point Ts, temperature at a viscosity at high temperature of 10⁴ dPa·s, temperature at a viscosity at high temperature of 10³ dPa·s, temperature at a viscosity at high temperature of 10$^{2.5}$ dPa·s, liquidus temperature TL, and viscosity log₁₀ηTL at the liquidus temperature TL.

The average thermal expansion coefficient CTE within a temperature range of from 30° C. to 380° C. is a value measured with a dilatometer.

The density is a value measured by a well-known Archimedes method.

The Young's modulus refers to a value measured by a well-known resonance method.

The strain point Ps, the annealing point Ta, and the softening point Ts are values measured in accordance with methods specified in ASTM C336 and C338.

The temperatures at viscosities at high temperature of 10⁴ dPa·s, 10³ dPa·s, and 10$^{2.5}$ dPa·s are values measured by a platinum sphere pull up method.

The liquidus temperature TL is a temperature at which a crystal precipitates after glass powder that has passed through a standard 30-mesh sieve (500 μm) and remains on a 50-mesh sieve (300 μm) is placed in a platinum boat and kept for 24 hours in a gradient heating furnace.

The liquidus viscosity $\log_{10}\eta TL$ is a value obtained by measuring the viscosity of the glass at the liquidus temperature TL by a platinum sphere pull up method.

As apparent from Tables 1 to 14, each of Sample Nos. 1 to 137, in which the glass composition is restricted to the predetermined range, has a Young's modulus of 80.1 GPa or more, a strain point of 681° C. or more, a liquidus temperature of 1,285° C. or less, and a liquidus viscosity of $10^{4.29}$ dPa·s or more, and is hence considered to have satisfactory productivity, be able to reduce thermal shrinkage in a LTPS process, and allow for less occurrence of defects due to deflection even when the glass sheet is increased in size and reduced in thickness. Accordingly, Sample Nos. 1 to 137 are each suitable as a substrate for an OLED device.

Meanwhile, Sample No. 138 had a temperature at a viscosity at high temperature of $10^{2.5}$ dPa·s as high as 1,653° C. and a Young's modulus as low as 77.5 GPa. Sample No. 139 had a strain point as low as 654° C. Sample No. 140 had an average thermal expansion coefficient within a temperature range of from 30° C. to 380° C. as high as $50.7\times10^{-7}$/° C. and a strain point as low as 679° C. Sample No. 141 had a liquidus temperature of more than 1,450° C., and its liquidus viscosity could not be measured.

INDUSTRIAL APPLICABILITY

The alkali-free glass sheet of the present invention is suitable as a substrate for an OLED device, particularly for an OLED TV. Other than those applications, the alkali-free glass sheet of the present invention is also suitable, for example, as a substrate for a flat panel display, such as a liquid crystal display, a cover glass for an image sensor, such as a charge coupled device (CCD) or a contact image sensor (CIS), a substrate and a cover glass for a solar cell, or a substrate for an OLED lighting device.

The invention claimed is:

1. An alkali-free glass sheet, which comprises as the glass composition, in terms of mol %, 58% to 69% of $SiO_2$, 12.7% to 14.5% of $Al_2O_3$, 0% to 4.5% of $B_2O_3$, 5.0% to 6.5% of MgO, 0.5% to 4% of BaO, 4.5% to 8% of CaO, 0.5% to 4.8% of SrO+BaO, and 0% to 0.5% of $Li_2O+Na_2O+K_2O$, and has a Young's modulus of 78 GPa or more, a strain point of 680° C. or more, and a liquidus temperature of 1,450° C. or less.

2. The alkali-free glass sheet according to claim 1, wherein the alkali-free glass sheet further comprises 0.001 mol % to 1 mol % of $SnO_2$.

3. The alkali-free glass sheet according to claim 1, wherein the alkali-free glass sheet has a strain point of 690° C. or more.

4. The alkali-free glass sheet according to claim 1, wherein the alkali-free glass sheet has a Young's modulus of more than 80 GPa.

5. The alkali-free glass sheet according to claim 1, wherein the alkali-free glass sheet has an average thermal expansion coefficient within a temperature range of from 30° C. to 380° C. of from $30\times10^{-7}$/° C. to $50\times10^{-7}$/° C.

6. The alkali-free glass sheet according to claim 1, wherein the alkali-free glass sheet has a liquidus viscosity of $10^{4.5}$ dPa·s or more.

7. The alkali-free glass sheet according to claim 1, wherein the alkali-free glass sheet comprises as the glass composition, in terms of mol %, 58% to 67% of $SiO_2$, 12.7% to 14.5% of $Al_2O_3$, 1.5% to 4.5% of $B_2O_3$, 5.0% to 6.5% of MgO, 2% to 4.8% of SrO+BaO, 0% to 0.5% of $Li_2O+Na_2O+K_2O$, and 4.5% to 8% of CaO, and is substantially free of $As_2O_3$ and $Sb_2O_3$.

8. The alkali-free glass sheet according to claim 1, wherein the alkali-free glass sheet comprises as the glass composition, in terms of mol %, 58% to 69% of $SiO_2$, 12.7% to 14.5% of $Al_2O_3$, 0% to 4.5% of $B_2O_3$, 5.0% to 6.5% of MgO, 0.5% to 4% of BaO, 5% to 8% of CaO, 0.5% to 4.8% of SrO+BaO, and 0% to 0.5% of $Li_2O+Na_2O+K_2O$, and has a Young's modulus of 78 GPa or more, a strain point of 680° C. or more, and a liquidus temperature of 1,450° C. or less.

9. The alkali-free glass sheet according to claim 1, wherein the alkali-free glass sheet comprises as the glass composition, in terms of mol %, 58% to 69% of $SiO_2$, 12.7% to 14.5% of $Al_2O_3$, 0% to 4.5% of $B_2O_3$, 5.0% to 6.0% of MgO, 0.5% to 4% of BaO, 4.5% to 8% of CaO, 0.5% to 4.8% of SrO+BaO, and 0% to 0.5% of $Li_2O+Na_2O+K_2O$, and has a Young's modulus of 78 GPa or more, a strain point of 680° C. or more, and a liquidus temperature of 1,450° C. or less.

10. The alkali-free glass sheet according to claim 1, wherein the alkali-free glass sheet comprises as the glass composition, in terms of mol %, 58% to 68% of $SiO_2$, 12.7% to 14.5% of $Al_2O_3$, 1.5% to 4.5% of $B_2O_3$, 5.0% to 6.5% of MgO, 2% to 4.8% of SrO+BaO, 0% to 0.5% of $Li_2O+Na_2O+K_2O$, and 4.5% to 8% of CaO.

11. The alkali-free glass sheet according to claim 10, wherein the alkali-free glass sheet comprises as the glass composition, in terms of mol %, 58% to 68% of $SiO_2$, 12.7% to 14.5% of $Al_2O_3$, 1.5% to 4.5% of $B_2O_3$, 5.0% to 6.5% of MgO, 2% to 4.8% of SrO+BaO, 0% to 0.5% of $Li_2O+Na_2O+K_2O$, and 5% to 8% of CaO.

12. The alkali-free glass sheet according to claim 10, wherein the alkali-free glass sheet comprises as the glass composition, in terms of mol %, 58% to 68% of $SiO_2$, 12.7% to 14.5% of $Al_2O_3$, 1.5% to 4.5% of $B_2O_3$, 5.0% to 6.0% of MgO, 2% to 4.8% of SrO+BaO, 0% to 0.5% of $Li_2O+Na_2O+K_2O$, and 4.5% to 8% of CaO.

13. The alkali-free glass sheet according to claim 1, wherein the alkali-free glass sheet is used for an OLED device.

14. An alkali-free glass sheet, which comprises as the glass composition, in terms of mol %, 58% to 69% of $SiO_2$, 12.7% to 14.5% of $Al_2O_3$, 1.5% to 4.5% of $B_2O_3$, 5.0% to 6.5% of MgO, 0.5% to 4% of BaO, 4.5% to 8% of CaO, 0.5% to 4.8% of SrO+BaO, and 0% to 0.5% of $Li_2O+Na_2O+K_2O$, and has a Young's modulus of 78 GPa or more, a strain point of 680° C. or more, and a liquidus temperature of 1,450° C. or less.

* * * * *